US012783638B2

(12) United States Patent
Nemmani et al.

(10) Patent No.: US 12,783,638 B2
(45) Date of Patent: Nov. 3, 2026

(54) SECURITY INTELLIGENT AUTOMATION FOR SOFTWARE DEVELOPMENT, SECURITY, AND OPERATIONS

(71) Applicant: Oracle International Corporation, Redwood City, CA (US)

(72) Inventors: Venkata Bhavani Shankar Nag Nemmani, Hyderabad (IN); Naveen Gupta, Hyderabad (IN)

(73) Assignee: Oracle International Corporation, Redwood City, CA (US)

(*) Notice: Subject to any disclaimer, the term of this patent is extended or adjusted under 35 U.S.C. 154(b) by 119 days.

(21) Appl. No.: 18/766,150

(22) Filed: Jul. 8, 2024

(65) Prior Publication Data

US 2026/0010616 A1 Jan. 8, 2026

(51) Int. Cl.
*G06F 21/52* (2013.01)
*G06F 21/57* (2013.01)

(52) U.S. Cl.
CPC ........ *G06F 21/52* (2013.01); *G06F 2221/033* (2013.01)

(58) Field of Classification Search
CPC ........................... G06F 21/52; G06F 2221/033
USPC ........................................................... 726/25
See application file for complete search history.

(56) References Cited

U.S. PATENT DOCUMENTS 8,881,111 B1 * 11/2014 Smith ................. G06F 11/3688 717/125
9,571,465 B1 * 2/2017 Sharifi Mehr ....... G06Q 10/083
10,855,717 B1 * 12/2020 Feiman ............... H04L 63/1425
10,904,281 B2 * 1/2021 Choi ..................... G06F 21/577
11,763,007 B1 * 9/2023 Nalluri .................. G06F 21/577 726/25
2004/0243349 A1 * 12/2004 Greifeneder ........ H04L 63/1408 702/183
2011/0191852 A1 * 8/2011 Sanders ................ G06F 21/577 718/1
2015/0106614 A1 * 4/2015 Lee ..................... G06F 21/6263 713/150

(Continued)

OTHER PUBLICATIONS

Kyle Coffey,; Vulnerability Analysis of Network Scanning on SCADA Systems; Wiely: Year:2018; pp. 1-21.*

(Continued)

*Primary Examiner* — Monjur Rahim

(57) ABSTRACT

Various embodiments of the present technology generally relate to systems and methods for providing a Security Intelligence Automation (SIA) engine. The SIA engine provided herein may include multiple security test plug-ins configured to perform a security assessment on a plurality of Open System Interconnection (OSI) layers of a target application. In an aspect, a method includes determining, by the SIA engine, security inputs for security test plug-ins and generating, by the SIA engine, one or more templates based on the security inputs. Each of the templates may correspond to a respective security test plug-in. After the security inputs are determined and the templates generated, the SIA engine may perform the security assessment on the target application based on the one or more templates, and in some cases the security inputs. Responsive to performing the security assessment, the SIA engine may generate a report including results from the security assessment.

19 Claims, 8 Drawing Sheets

(56) References Cited

U.S. PATENT DOCUMENTS

| | | | | |
|---|---|---|---|---|
| 2017/0013008 | A1* | 1/2017 | Carey | H04L 63/02 |
| 2023/0128008 | A1* | 4/2023 | Clement | G06F 11/3684<br>717/124 |

OTHER PUBLICATIONS

CIS Kubernetes Benchmarks [online], Center for Internet Security, 2024. Retrieved from the Internet: https://www.cisecurity.org/benchmark/kubernetes, 5 pages.

Controls [online], ARMO User Hub, ARMO The Makers of Kubescape, 2024. Retrieved from the Internet: https://hub.armosec.io/docs/controls, 2 pages.

Fuzzing [online], OWASP Foundation, 2024. Retrieved from the Internet: https://owasp.org/www-community/Fuzzing, 8 pages.

Holl, K., "SANS Security Essentials, GSEC Practical Assignment Version 1.4b: OSI Defense in Depth to Increase Application Security," GIAC Certifications, Global Information Assurance Certification Paper, SANS Institute, 2003, Retrieved from the Internet: https://www.giac.org/paper/gsec/4041/smak/106487, 20 pages.

Mervana, P., "OpenSSL Command to Check Certificate: A Comprehensive Guide," SSL Insights, 2024. Retrieved from the Internet: https://sslinsights.com/openssl-command-to-check-certificate/, 16 pages.

OWASP API Security Project [online], OWASP Foundation, 2023. Retrieved from the Internet: https://owasp.org/www-project-api-security/, 6 pages.

OWASP Top Ten [online], OWASP Foundation, 2021. Retrieved from the Internet: https://owasp.org/www-project-top-ten/, 5 pages.

* cited by examiner

SECURITY INTELLIGENT AUTOMATION FOR SOFTWARE DEVELOPMENT, SECURITY, AND OPERATIONS

TECHNICAL FIELD

Various embodiments of the present technology generally relate to deployment of cloud services, operations and software. More specifically, embodiments of the present technology relate to systems and methods for providing security intelligent automation (SIA) engine(s) for performing security testing and evaluation of software applications across the various life stages of the application, including during deployment and in operation, as well as across multiple Open System Interconnection (OSI) layers.

BACKGROUND

In the rapidly evolving landscape of software development, ensuring the security of applications has become paramount. Traditional security measures, often implemented at the end of the development cycle, are no longer sufficient to address the sophisticated threats faced by modern applications. This has led to the emergence of DevSecOps platforms, which integrate security practices into every phase of the development process. By embedding security evaluations into continuous integration and continuous delivery (CI/CD) pipelines, DevSecOps platforms enable organizations to identify and mitigate security issues early and efficiently. As cyber threats become more advanced and regulatory requirements more stringent, organizations are increasingly adopting DevSecOps approaches to enhance their security posture. This integration not only streamlines security assessments but also fosters a culture of shared responsibility among development, operations, and security teams, ensuring that applications are both robust and resilient from the outset.

Despite the significant advantages of conventional DevSecOps platforms, several shortcomings hinder their effectiveness in identifying security issues comprehensively. One major challenge is the generation of a large volume of noise, where the system flags numerous false positive, irrelevant, or low-priority issues, overwhelming development teams and obscuring critical vulnerabilities. Additionally, many conventional DevSecOps tools limit their analysis to a single OSI layer, failing to provide a holistic view of the application's security posture across the entire stack. These platforms are often designed to efficiently identify prominent and well-known security issues but may struggle to detect more complex, nuanced vulnerabilities that require deeper inspection. Consequently, organizations still need to perform additional, often manual, focused assessments to uncover these intricate security flaws. This reliance on manual intervention can slow down the development process and introduce potential human error, undermining the efficiency and thoroughness that DevSecOps aims to achieve.

Accordingly, there exists a need for SIA engine(s) for providing security testing and evaluation of software applications. In particular, there is a need for SIA engines that can perform security analysis of software applications across multiple OSI layers to provide a comprehensive and highly accurate evaluation of security issues across the lifecycle of an application.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing an SIA engine and its related functions. As will be expanded on below in greater detail, the SIA engine may be provided as part of a DevSecOps platform or pipeline to identify security issues with a target asset, such as a target application during the development and deployment process. In an embodiment, the SIA engine may include security test plug-ins that are configured to perform security tests on Open System Interconnection (OSI) layers 7 to 5, and in some cases, layers 7 to 4. The SIA engine may be requested to perform a security assessment on the target application, that includes multiple security tests. Each of the security tests may correspond to a respective security test plug-in of the SIA engine. As such, responsive to the request, the SIA engine may determine a respective security test plug-in and call each security test plug-in in turn to perform the security assessment.

When each security test plug-in is called, the SIA engine may coordinate with a respective component within each plug-in to determine security inputs required for the respective security test. As will be expanded on below, in some cases, SIA engine may generate context-based security inputs based on the target application and use them to perform the security assessment. In some embodiments, the SIA engine may then generate or configure templates based on these security inputs.

Once the security inputs are determined and the templates configured, the SIA engine may perform the security assessment on the target application. Performing the security assessment may include executing or running each respective security test plug-in. In some cases, the SIA engine may sequentially execute each security test plug-in to complete each security test. From the results of each security test performed by a respective security test plug-in, the SIA engine may generate a report. In some cases, the SIA engine may provide the report to the DevSecOps platform for integration into the development and management of the target application.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
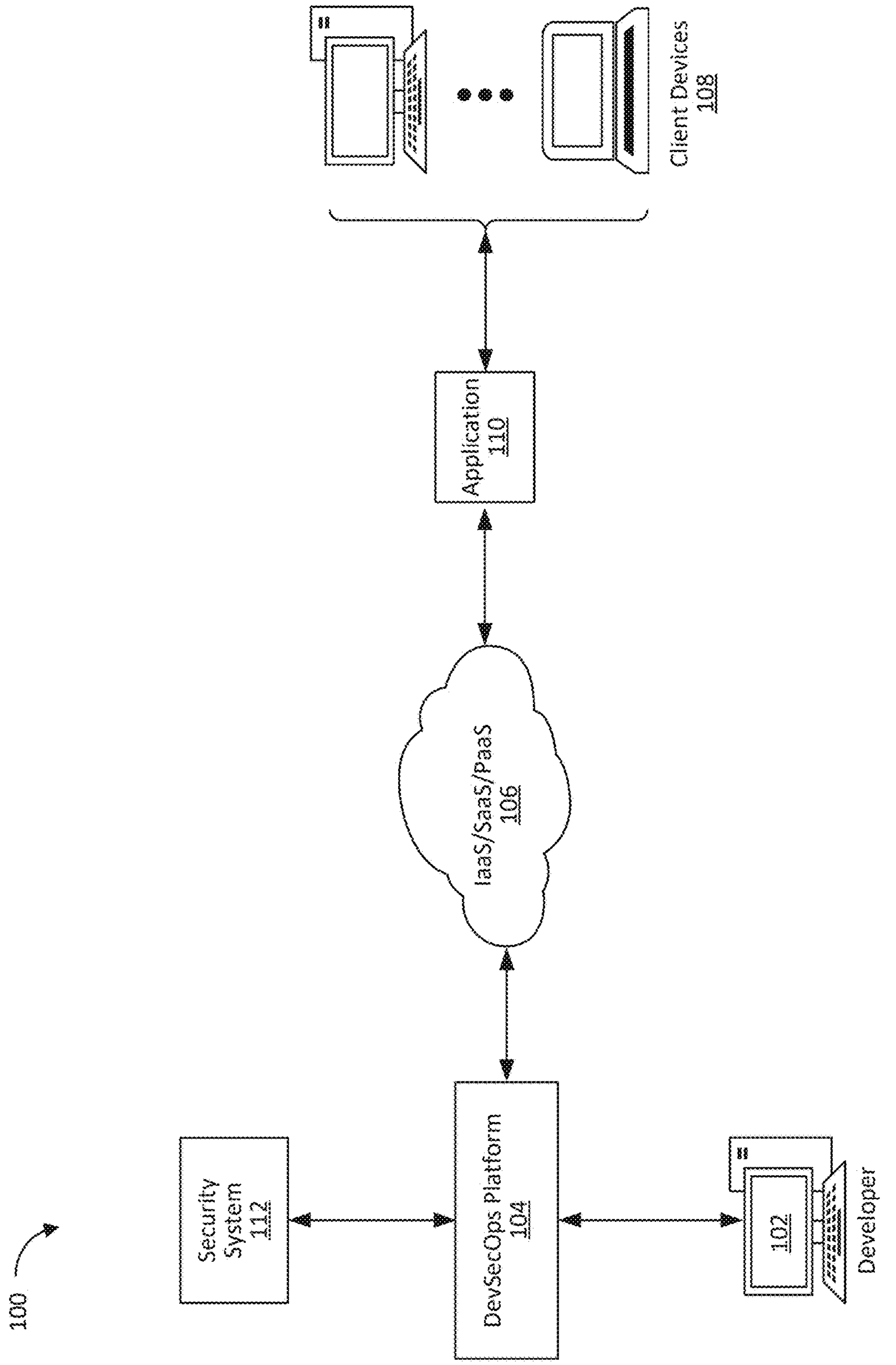
FIG. 1 illustrates an example operational environment in which assets, such as a software application, may be deployed, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the rapidly evolving landscape of software development, the importance of rigorous security testing has never been greater. Traditional security measures, often implemented late in the development cycle, fall short in addressing the sophisticated threats that modern applications face. This inadequacy has driven the adoption of DevSecOps platforms, which integrate comprehensive security practices throughout every phase of the development process. By embedding critical security evaluations into CI/CD pipelines, DevSecOps platforms empower organizations to proactively identify and mitigate security issues. As cyber threats grow more complex and regulatory demands become stricter, the shift towards DevSecOps is essential for enhancing organizational security posture. These platforms not only streamline security assessments but also cultivate a culture of shared responsibility among development, operations, and security teams, ensuring applications are secure and resilient from inception to deployment.

Despite the significant advantages of DevSecOps platforms, several shortcomings hinder their effectiveness in comprehensively identifying security issues, leading to serious negative outcomes. One major challenge arises from the reliance on Dynamic Application Security Testing (DAST) tools, commonly used by DevSecOps platforms for security testing. DAST tools perform security evaluations by simulating external attacks on a running application and analyzing its responses to identify vulnerabilities such as SQL injection, cross-site scripting (XSS), and other runtime issues. While these tools are valuable for detecting security flaws in the application's behavior, they have notable shortcomings. DAST tools typically generate a high volume of false positives, overwhelming security teams with alerts that may not represent genuine threats. They are also limited to evaluating vulnerabilities present during runtime, potentially missing issues in the codebase or design phase that only static analysis could uncover. Additionally, DAST tools often struggle with complex, multi-layered applications and are restricted to evaluating a single OSI layer at a time, which prevents a holistic view of the application's security posture.

As can be appreciated, these limitations of conventional DevSecOps platforms, particularly those associated with DAST tools, can lead to significant negative consequences for organizations. Relying solely on DAST tools' runtime evaluations and their limitations to single OSI layers can result in undetected vulnerabilities across different layers of the application stack. This narrow focus increases the risk of critical security flaws going unnoticed until they are exploited in production environments, potentially leading to data breaches, service disruptions, or compliance violations. Moreover, the high volume of false positives generated by DAST tools can overwhelm security teams, diverting their attention from genuine threats and delaying remediation efforts. The incomplete coverage of complex, multi-layered applications further exacerbate these risks, leaving organizations vulnerable to sophisticated cyber-attacks that exploit overlooked vulnerabilities. Consequently, without addressing these shortcomings and augmenting DAST tools with comprehensive security measures, organizations may face severe financial, reputational, and operational repercussions.

To address at least these shortcomings of conventional DevSecOps platforms, in particular those relying on DAST tools, example security intelligence automation (SIA) engine(s) are provided herein. In particular, the SIA engine provided herein provides more efficient and accurate security testing and evaluation of software applications over conventional approaches. Unlike conventional approaches, such as DAST tools, the SIA engine may gather contextual information on a target application and use this information during the security evaluation to minimize false positives. Moreover, the SIA engine can integrate manual security findings into plug-and-play tests cases, thereby enabling automation of security testing and faster scaling of security assessments that can encompass multiple applications with diverse interface complexities, including intricate authentication and navigation requirements, in a single security assessment.

As will be expanded on in greater detail below, the SIA engine is able to perform a security evaluation across multiple OSI layers (e.g., from OSI Layer 4 to Layer 7), thereby providing a holistic and comprehensive vulnerability assessment that can identify true positives while eliminating false positives. Additionally, by integrating a validated test suite that recognizes known security vulnerability patterns through intelligent automation, the SIA engine enhances detection precision, thereby reducing if not eliminating false positives. As noted above, conventional security techniques often generate vast amounts of false positives, due in part to security inputs for the assessments being generic. That is, the same tests, along with generic security inputs, are used during conventional security assessments. As such, a target application may generate errors or fail to perform correctly due to improper security inputs, thereby generating false positives for security vulnerabilities.

To prevent such false positives, the SIA engine may generate context-based security inputs based on the target application. These context-based security inputs may be generated based on an API schema associated with the target application. Since the context-based security inputs are tailored or customized based on the target application, false positives may be avoided during the security assessment. In other words, by inserting security inputs that are generated based on the target application (e.g., security inputs based on the API schema of the target application) into the comprehensive test suite, the accuracy of security issue identification may be enhanced. Moreover, the SIA engine can integrate new security findings as plug-and-play test cases into the test suite to enhance flexibility and adaptability of the security evaluation process. Ultimately, the SIA engine provides a holistic evaluation of an application's security to support informed decision-making on product readiness, deployment, and operation.

By providing accurate security assessments of a target application across multiple OSI layers, the SIA engine provides numerous benefits and advantages over conventional security techniques, including identifying vulnerabilities with precision, minimizing false positives, and reducing unnecessary noise. As will be described in greater detail below, the SIA engine can comprehensively evaluate security of a target application, from the transport layer to the application layer, thereby providing a holistic view of the target application's infrastructure resilience against potential threats. That is, security assessments encompassing layers from network protocols to user interfaces ensure that vulnerabilities are unearthed at their roots, enabling proactive mitigation strategies. Additionally, by providing pinpointed vulnerability results, the SIA engine allows for enhanced remediation efforts, ensuring that resources are directed effectively towards critical issues that pose genuine risks. Overall, the SIA engine not only fortifies defenses against cyberattacks but provides developers and teams with vital information that allows them to prioritize and address vulnerabilities swiftly, thereby safeguarding sensitive data, maintaining regulatory compliance, and preserving business continuity in an increasingly interconnected digital landscape.

Turning now to the Figures, FIG. 1 illustrates an example operational environment 100 in which one or more assets, such as an application 110, may be deployed, according to an embodiment herein. In the illustrated example, one or more developers 102 may leverage a DevSecOps platform 104 for development, deployment, and management of the application 110 within a cloud-based operation. As those skilled in the art readily appreciate, the DevSecOps platform 104 may provide a centralized environment where development, security, and operations teams collaborate closely, streamlining the entire development lifecycle of an asset, such as the application 110. Through automation and integration with cloud services, the DevSecOps platform 104 enables the developers 102 to efficiently build, test, and deploy applications across various cloud environments. For example, the DevSecOps platform 104 facilitates continuous integration and continuous deployment (CI/CD) pipelines, automating the process of code integration, testing, and deployment, thereby accelerating time-to-market and ensuring the reliability of asset releases.

It should be appreciated that while the following discussion is with respect to a software application, such as the application 110, the discussion is equally applicable to other assets developed and deployed via the DevSecOps platform 104. As used herein, the term "assets" refers to the various components, assets, and entities utilized within a computing environment to facilitate the development, deployment, and operation of software applications. These assets encompass a broad spectrum, including but not limited to computing instances, virtual machines, storage, networking infrastructure, code repositories, libraries, and configurations. Assets serve as building blocks that developers leverage to create, test, deploy, and maintain software solutions effectively. They enable the allocation of computational power, storage capacity, and network connectivity required for executing software tasks and services. Additionally, assets encompass the source code, libraries, and dependencies necessary for software development, as well as the runtime environments and configurations essential for software execution. Overall, assets in the context of software represent the foundational elements that enable the functioning and management of software systems within computing environments.

As noted above, the developers 102 may build, test, and deploy the application 110 via the DevSecOps platform 104. Once the application 110 is in a state for deployment, the developers 102 may interact with one or more of IaaS/SaaS/PaaS systems 106 for release into a cloud-environment or operation. It should be appreciated, that while the following discussion is made with respect to IaaS/SaaS/PaaS systems 106, the description is equally applicable to traditional datacenter contexts, such as those that implement modern Software Deployment Life Cycle (SDLC) practices like CI/CD.

The DevSecOps platform 104 may orchestrate the interaction between IaaS/SaaS/PaaS systems 106 to deploy the application 110 finalized by the developers 102 in cloud-based operations. For example, the DevSecOps platform 104 may leverage the IaaS to provision and manage the underlying infrastructure resources required for deploying application 110, such as virtual machines, storage, and networking components. This allows the developers 102 to dynamically allocate and scale resources based on application needs, optimizing performance and cost-efficiency. Meanwhile, PaaS systems provide a comprehensive development and deployment environment, enabling developers to build, test, and deploy applications without worrying about the underlying infrastructure. The DevSecOps platform 104 seamlessly integrates with these PaaS systems, automating the deployment process and ensuring consistency across different environments. Through CI/CD pipelines, the DevSecOps platform 104 automates the building, testing, and deployment of software, facilitating rapid and reliable software releases.

Figure 8:
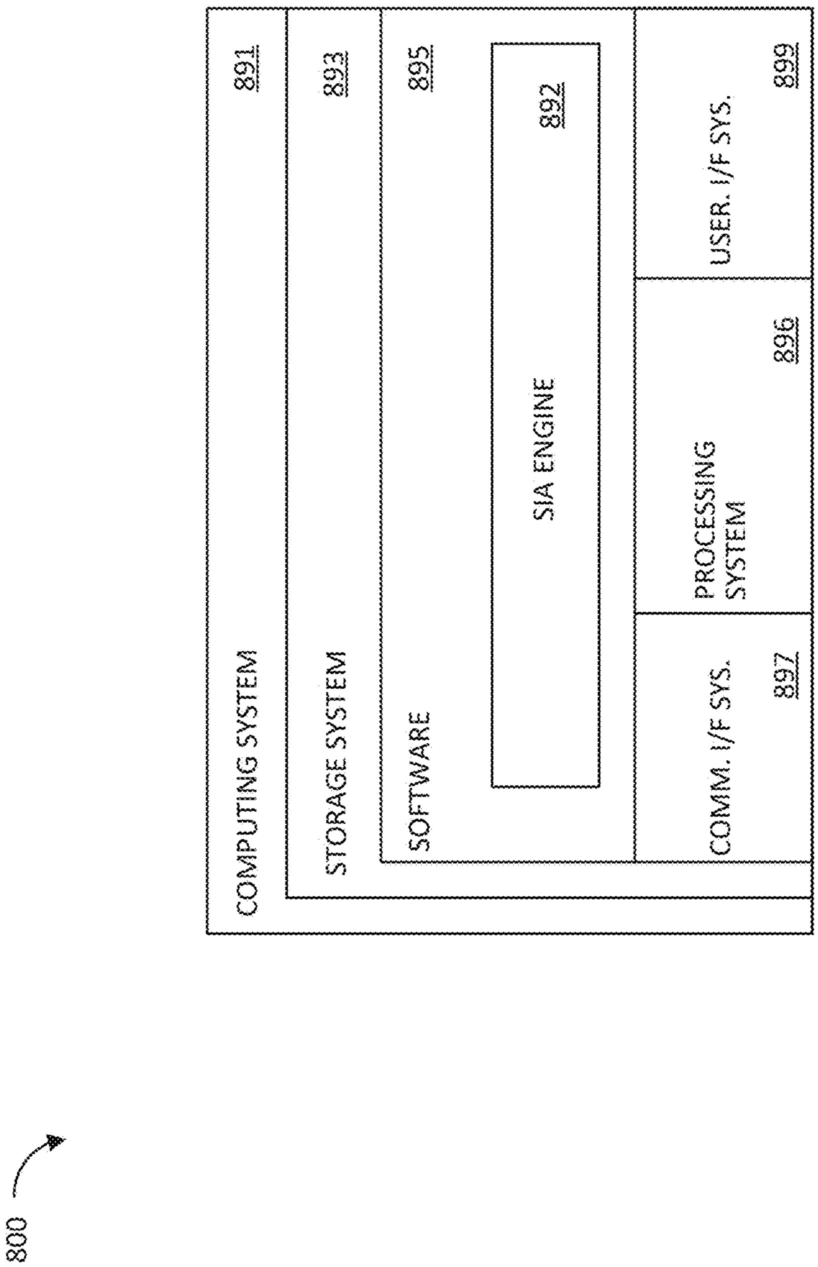
FIG. 8 shows an example computing device suitable for providing an SIA engine and its related functions, according to an embodiment herein.

Once the application 110 is deployed, one or more client devices 108 may interact with the application 110, or in the case of an asset, the asset as it is integrated into the application 110. In particular, the client devices 108 may interact with the application 110 as it is provisioned and managed by the IaaS/SaaS/PaaS systems 106. Broadly speaking, the client devices 108 may access and interact with the application 110 in a cloud environment by, for example, communicating with the application 110 via one or more internets and intranets, the Internet, wired and wireless networks, local area networks (LANs), wide area networks (WANs), or any other type of network or combination thereof. Examples of the client devices 108 may include personal computers, tablet computers, mobile phones, gaming consoles, wearable devices, Internet of Things (IoT) devices, and any other suitable devices, of which computing apparatus 891 in FIG. 8 is also broadly representative.

Within the cloud environment, the IaaS/SaaS/PaaS system 106 may dynamically provision and manage the necessary resources, such as servers, databases, and networking components to support the application's 110 operation. As client requests are received from the client devices 108 are processed by the application's 110 backend logic, the IaaS/SaaS/PaaS system 106 scales resources in real-time to accommodate varying demand levels, ensuring optimal performance and reliability. Subsequently, the application 110 may generate a response based on the client's request, which is then delivered back to the client devices 108 over secure networking channels. As is appreciated, the client devices 108 may interact with the application's 110 user interface to view results, input data, or perform additional actions, initiating a cycle of interaction and response facilitated by the cloud-based infrastructure. Throughout this process, the IaaS/SaaS/PaaS systems 106 continually adjusts resources to meet changing demand, enabling seamless and efficient interaction with the application 110 in the cloud environment.

Prior to deployment of the application 110, the developers 102 may interact with a security system 112 to ensure that the application 110 is compliant with respective policies and regulations. As those in the art readily appreciate, software applications are often required to adhere to various policies and regulations to ensure compliance with industry standards and legal requirements. For instance, in the healthcare sector, software must comply with the Health Insurance Portability and Accountability Act (HIPAA) to safeguard patient data privacy and security. Similarly, financial software must adhere to regulations such as the Payment Card Industry Data Security Standard (PCI DSS) to protect sensitive payment information. In addition to industry and legal regulations, organizations often have governing policies as well to which assets are required to adhere to. Compliance with these policies and regulations (hereafter "policies") is essential to mitigate risks, protect user privacy, and uphold trust in software applications across different industries.

In addition to validating the application 110 for policy and regulation compliance (hereinafter "policy compliance"), the security system 112 may also validate and verify the application's 110 provenance. Authenticating the application 110 and verifying its provenance are critical steps, particularly within restricted environments, as they ensure that only trusted and authorized software is deployed. By confirming the authenticity and origin of the application 110, organizations can mitigate the risk of malicious code infiltration, maintain the integrity of systems, and uphold regulatory compliance. In restricted environments such as government agencies or highly regulated industries, authenticating the application 110 and verifying its provenance are essential safeguards against security breaches, data compromise, and potential threats to national security or sensitive information.

Under conventional approaches, the DevSecOps platform 104 may use Dynamic Application Security Testing (DAST) tools to perform security testing and evaluation on the application 110 during various stages of development and deployment to validate the application's 110 policy compliance and identify any vulnerabilities. While DAST tools are typically integrated into the CI/CD pipeline to evaluate applications for vulnerabilities by simulating real-world attacks, these tools do not have knowledge of the specific attack surfaces they are trying to test. Instead, DAST tools rely on generic security inputs during testing, which often leads to false positives because the application 110 being tested may not properly recognize or handle these inputs, resulting in misleading findings. This reliance on generic inputs causes DAST tools to struggle with complex applications, as they cannot tailor their tests to the application's unique structure and behaviors. As can be appreciated, the false positives generated under conventional security approaches, often cause negative consequences, such as wasted time and resources as the developers 102 chase down non-existent issues, which can detract from addressing genuine security vulnerabilities.

Additionally, under conventional security approaches, such as use of DAST tools, typically only one OSI layer is evaluated at a time, which often presents significant technical limitations. For instance, while DAST tools can effectively probe the application's 110 application layer for vulnerabilities such as SQL injection or cross-site scripting (XSS), they are unable to simultaneously assess lower OSI layers like the session, presentation, transport and network layers. This single-layer focus means that complex, multi-layered security issues may go undetected. For example, an attack vector that spans both the transport and application layers might not be identified if each layer is only examined in isolation. Consequently, this fragmented approach can result in incomplete insights into the overall security posture of the application 110, leaving potential vulnerabilities unaddressed and exposing the application to multi-faceted attacks that exploit weaknesses across multiple OSI layers.

Accordingly, to address at least these issues present in conventional security testing and techniques, the DevSecOps platform 104 may include or be in operable communication with a Security Intelligence Automation (SIA) engine as described below.

Figure 2:
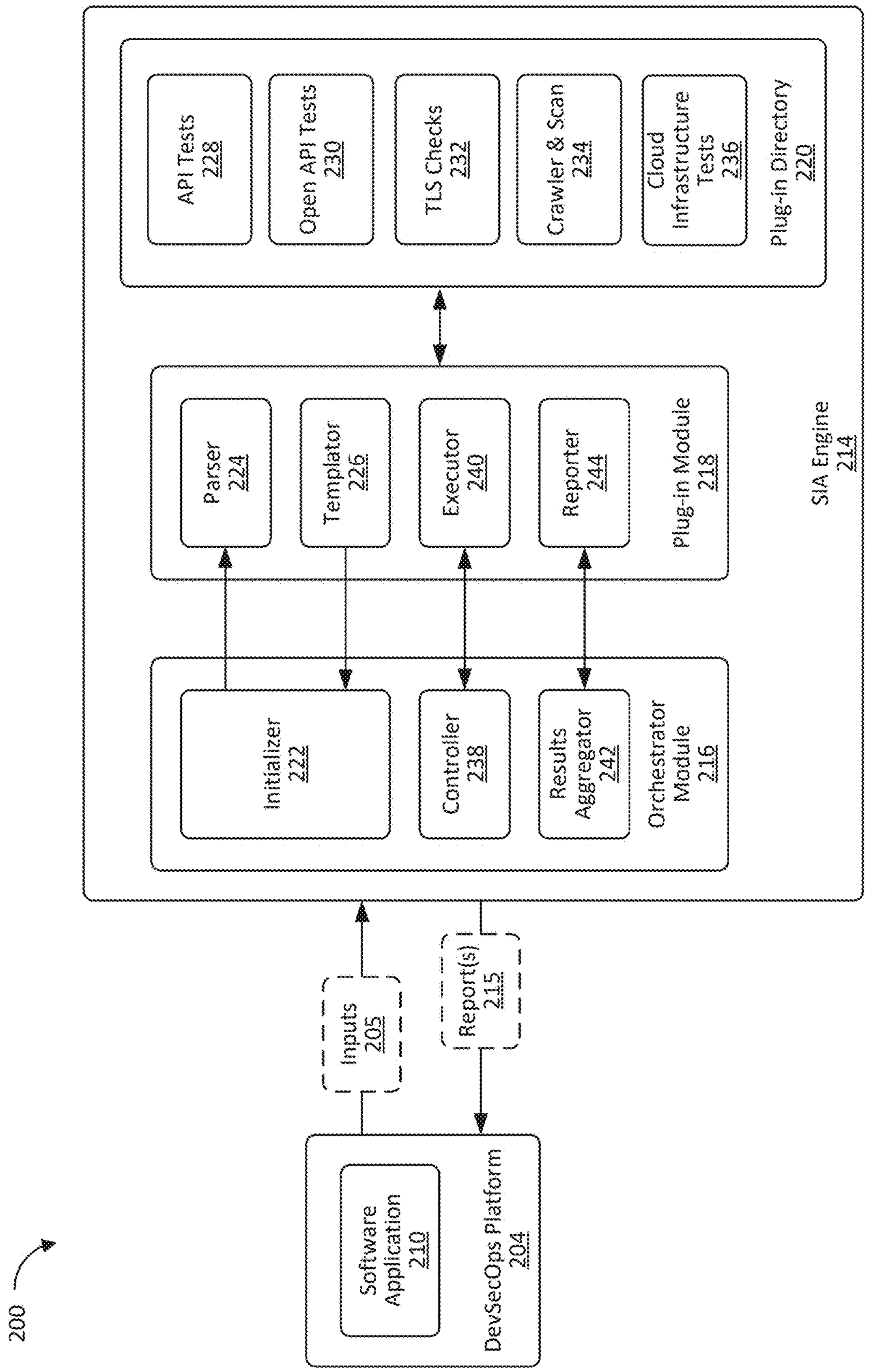
FIG. 2 illustrates an example operational environment including an SIA engine, according to an embodiment herein.

Referring now to FIG. 2, an example operational environment 200 including an SIA engine 214 is illustrated, according to an embodiment herein. The operational environment 200 may be the same or similar to the operational environment 100 by, for example, including a DevSecOps platform 204 that is associated with the development, security, and deployment of a software application 210, which may be the same or similar to the DevSecOps platform 104 and the application 110, respectively.

Figure 3:
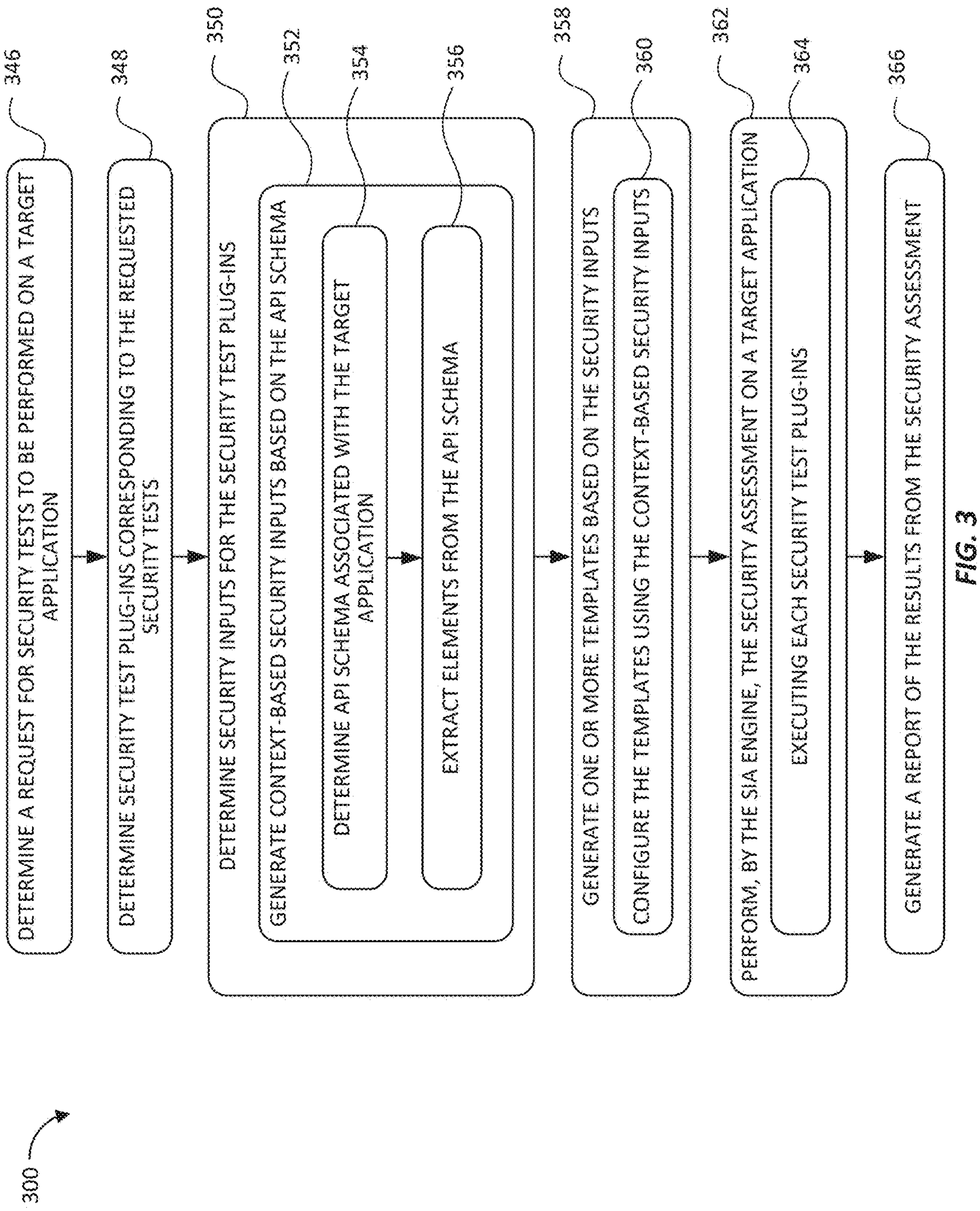
FIG. 3 illustrates an example SIA engine process, according to an embodiment herein.

For ease of explanation, FIG. 2 is described in conjunction with FIG. 3, which provides an example SIA engine process, in particular a process 300 for providing the SIA engine 214 and one or more of its functions, according to an embodiment herein. While FIG. 3 is described with relation to FIG. 2, it should be appreciated that components, elements, and steps from any other Figures described herein may be equally applicable.

As noted above, the DevSecOps platform 204 may be used by developers, such as the developers 102, for generation, security, deployment, and management of software assets, such as the application 210. For example, the DevSecOps platform 204 may perform various security assessments on the application 210 during various stages of development and deployment to identify security issues present within the application 210. In particular, the DevSecOps platform 204 may include or be in operable communication with the SIA engine 214 to perform security assessments of the application 210. For example, in some embodiments, the SIA engine 214 may be part of the DevSecOps platform 204, while in other embodiments, the SIA engine 214 may be part of a broader security system, such as the security system 112. In still other embodiments, the SIA engine 214 may be hosted by a third party.

It should be appreciated that while the following discussion is with respect to the application 210, the DevSecOps platform 204 may be handling (e.g., building, developing, monitoring, deploying) any number of assets at a given time. As such, the DevSecOps platform 204, in particular the SIA engine 214, may perform any number of security assessments at any given time. As will be expanded on below, an advantage of the SIA engine 214 is that it can perform security assessments to multiple assets (e.g., software applications) with hundreds if not thousands of exposed interfaces, each having different and complex authentication and navigation requirements.

At a desired point during development or deployment of the application 210, developers may request a security assessment be performed on the application 210 (346). In some embodiments, the developers may transmit a request, via the DevSecOps platform 204, to the SIA engine 214. In some embodiments, the request for a security assessment of the application 210 may include an input 205. The input 205 may include various information necessary to perform the security assessment. For example, the input 205 may include an input configuration file, a source code repository, dependency lists, environment-specific variables, and/or other information necessary for reproducing the application's 210 runtime environment accurately.

The SIA engine 214 may receive the input 205 from the DevSecOps platform 204. Responsive to receiving the input 205, the SIA engine 214 may determine which security tests are requested to be performed during the security assessment. In particular, the SIA engine 214 may include an orchestrator module 216. The orchestrator module 216 may include various components that handle certain functions or phases of the security assessment. As illustrated, the orchestrator module 216 includes an initializer 222, a controller 238, and a results aggregator 242, each of which is described in greater detail below.

When the input 205 is received by the SIA engine 214, the orchestrator module 216 may determine the security tests requested to be performed on the application 210. For example, the application 210 may determine which security tests to be performed based on which attack surfaces are identified in the input 205. As those skilled in the art readily appreciate, an attack surface in the context of security testing of a software application refers to the collection of all points where an unauthorized user (e.g., attacker) may try to enter data to or extract data from the system. This may encompass potential vulnerabilities, including those in the software code, network interfaces, user interfaces, and even physical points of access. The attack surface is crucial because it represents the scope within which an attacker can operate, and understanding its extent is essential for effective security testing and mitigation strategies.

Figure 4:
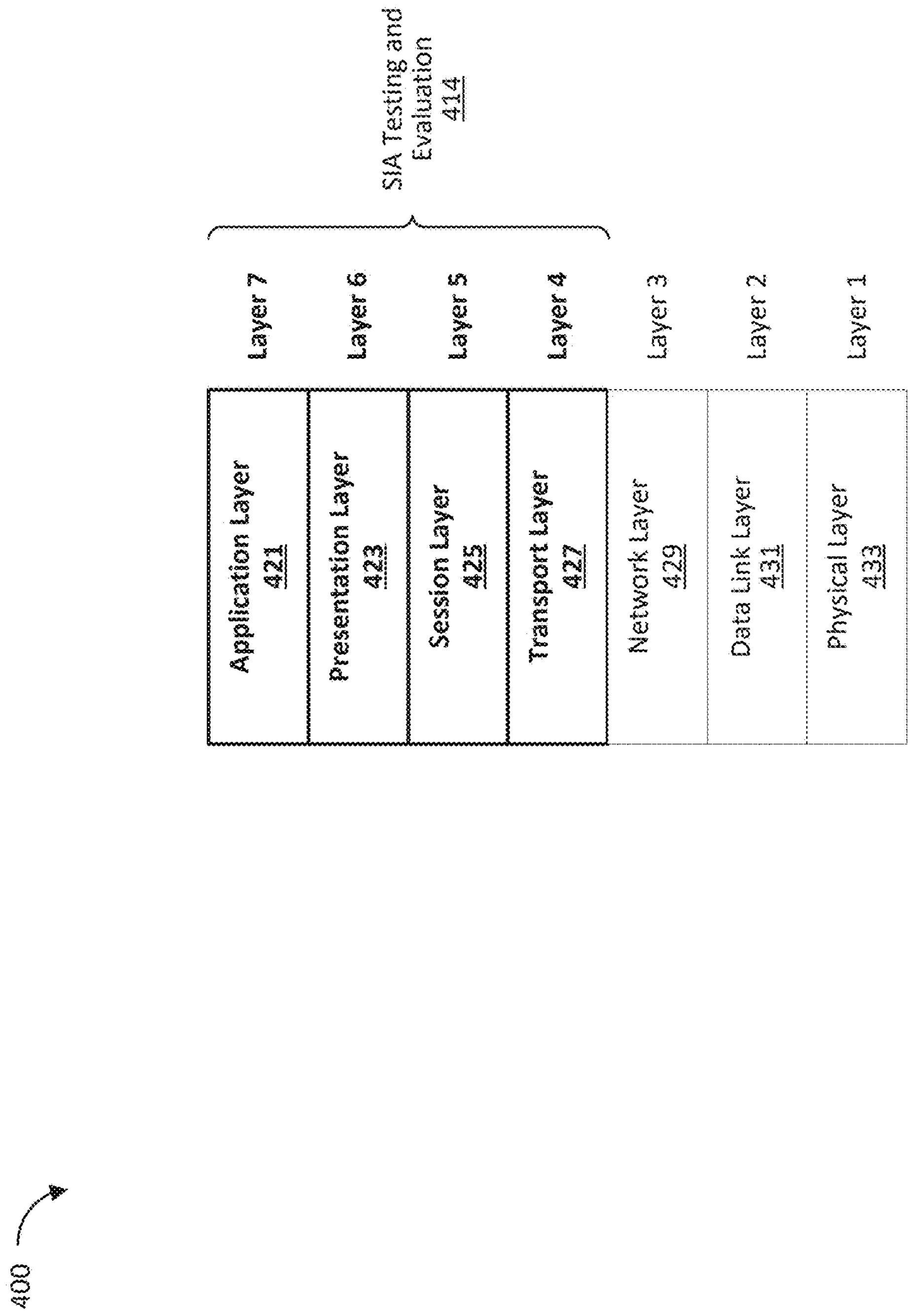
FIG. 4 illustrates an example Open Systems Interconnection (OSI) framework, according to an embodiment herein.

An attack surface may correspond to a respective layer of the OSI (Open Systems Interconnection) model, which provides a framework for understanding different aspects of network interactions. Referring now to FIG. 4, an example OSI framework 400 is illustrated, according to an embodiment herein. As illustrated, the OSI framework 400 may include seven layers including an application layer 421, a presentation layer 423, a session layer 425, a transport layer 427, a network layer 429, a data link layer 431, and a physical layer 433.

Each of these layers may be susceptible to different security issues or vulnerabilities. As such, each may have a different attack surface. For example, at the application layer 421 (Layer 7), vulnerabilities might include weaknesses in web applications, APIs, and user authentication mechanisms. At the presentation layer 423 (Layer 6), issues might involve improper data encoding or decoding. The session layer 425 (Layer 5) could expose weaknesses in session management, while the transport layer 427 (Layer 4) might be susceptible to attacks on data transmission protocols like TCP and UDP. Network layer 429 (Layer 3) vulnerabilities could include IP spoofing and routing attacks, and the data link layer 431 (Layer 2) might face issues like MAC address spoofing and VLAN hopping. Finally, at the physical layer 433 (Layer 1), vulnerabilities might encompass physical tampering or interception of network cables.

The DevSecOps platform 204 may primarily evaluate security and vulnerabilities at OSI layers 4 to 7 (414), such as the application layer 421, the presentation layer 423, the session layer 425, and the transport layer 427, because these layers are directly associated with the software application's 210 functionality and communication protocols, which are within the scope of software development and deployment. In contrast, OSI layers 1 to 3, which include the network layer 429, the data link layer 431, and the physical layer 433, are typically outside the purview of the DevSecOps platform 204 because these layers pertain to the physical infrastructure and basic networking functions rather than software applications. As such, security issues at these layers involve hardware components, physical network connections, and routing mechanisms, which are usually managed by IT infrastructure teams and network administrators. Accordingly, the DevSecOps platform 204, in particular, the SIA engine 214 may concentrate on layers 4 to 7 to address the security needs directly related to software development, ensuring comprehensive application security throughout the software lifecycle without overlapping with the responsibilities of infrastructure security teams.

As noted above, the input 205 may identify one or more attack surfaces for the security assessment. Based on the identified attack surfaces, the SIA engine 214 may determine corresponding security tests to perform. That is, if the orchestrator module 416 determines the attack surface to include the application layer 421, then the orchestrator module 416 may determine API security tests may apply. Similarly, if the orchestrator module 416 determines that the attack surface includes the transport layer 427, then the orchestrator module 416 may determine TLS (Transport Layer Security) tests or checks may apply. As can be appreciated, understanding the attack surface across these OSI layers helps security testers identify and prioritize vulnerabilities, ensuring comprehensive security coverage and robust defenses against potential threats. By mapping out the attack surface, SIA engine 214 can apply targeted security tests to reduce the risk of exploitation at each layer Once the SIA engine 214 determines security tests to be performed during the security assessment, the SIA engine 214 may determine a corresponding security test plug-in for each security test (348). In particular, the orchestrator module 216 may determine which security test plug-ins are requested to perform the requested security tests. As illustrated, the SIA engine 214 may include a plug-in directory 220. The plug-in directory 220 may include various security test plug-ins for performing respective security tests. For example, as shown, the plug-in directory 220 may include an API test plug-in 228, an Open API test plug-in 230, a TLS check plug-in 232, a crawler and scan plug-in 234, and a cloud infrastructure test plug-in 236. It should be appreciated that while only these security tests plug-ins are described herein, the plug-in directory 220 may include security test plug-ins corresponding to other types of security tests.

As used herein, the security test plug-ins 228-236 are specialized tools or containerized logic that can detect and mitigate security issues in the application 210. These security test plug-ins 228-236 may automate a variety of security tests, ensuring comprehensive coverage of potential vulnerabilities. For example, the API security test plug-in 228 may assess the security of application programming interfaces (APIs) of the application 210, identifying weaknesses such as improper authentication, authorization flaws, and data exposure risks. The Open API security test plug-in 230 may extend the security test plug-in's 228 functionality by specifically evaluating APIs defined by an Open API specification associated with the application 210, ensuring that API endpoints adhere to security best practices and are resilient against common attacks like SQL injection and cross-site scripting (XSS).

The TLS check plug-in 232 may verify that data transmitted between clients and servers is encrypted and secure, preventing interception and tampering by attackers. Additionally, the TLS check plug-in 232 may ensure that certificates are properly configured and that strong encryption protocols are used, safeguarding data integrity and confidentiality. The crawler and scan plug-in 234 may be used to systematically explore and analyze web applications, identifying vulnerabilities such as broken links, outdated libraries, and insecure configurations. In some cases, the crawler and scan plug-in 234 may simulate an attacker's approach to uncover hidden vulnerabilities by crawling through the entire application, scanning for potential security weaknesses.

The cloud infrastructure plug-in 236 may assess the security of cloud-based environments, examining the configuration and deployment settings of cloud resources. The cloud infrastructure plug-in 236 may ensure that cloud services are properly configured to prevent unauthorized access, data breaches, and other security incidents. This plug-in 236 may check for issues such as insecure storage buckets, misconfigured identity and access management (IAM) policies, and inadequate network security groups.

As noted above, conventional security approaches, such as DAST tools, can typically only evaluate or perform one of these security tests at a time, meaning that only one attack surface or OSI layer is evaluated at a time. As can be appreciated, evaluation of a single attack surface or OSI layer at a time may fail to provide a cohesive and comprehensive security assessment of the application 210. In contrast, the SIA engine 214 can employ multiple of the security test plug-ins 228-236 at a time, based on the input 205 (or a single request), to perform a comprehensive security assessment of the application 210. By utilizing a diverse range of security tests, the SIA engine 214 can comprehensively assess the security posture of the application 210, thereby allowing development teams to detect and address vulnerabilities early in the development process, ensuring that the application 210 is secure and resilient against a wide array of threats.

By utilizing plug-ins for security tests, the SIA engine 214 enhances the accuracy and efficiency of security assessments. For example, by allowing each plug-in to perform a single, focused process tailored to the specific inputs of a respective software application, such as the input 205 for the application 210, the SIA engine 214 can ensure that respective results are accurate. In other words, by employing the security test plug-ins 228-236, the SIA engine 214 can fine-tune or tailor each plug-in to address the particular vulnerabilities and security requirements unique to a respective target application it is testing. For instance, as will be expanded on in greater detail blow, the API test plug-in 228 can be customized to scrutinize the specific endpoints and data structures of the application's 210 API, while the TLS check plug-in 232 can be tailored to ensure the correct implementation of encryption protocols specific to the application's 210 communication needs. As noted above, under conventional approaches, security types were generally not tailored to a specific asset or application, and as such, generic inputs were used, often resulting in a large volume of false positives for security issues.

In addition to providing tailored security tests, the security test plug-ins 228-236 facilitate reusability and scalability in security testing. That is, once developed, the security test plug-ins 228-236 can be integrated into different projects and environments, such as within different stages of the DevSecOps pipeline, without significant modifications, making them highly reusable. That is, the security test plug-ins 228-236 provide a modular approach that allows for consistent and repeatable security testing across various applications and development pipelines. Furthermore, the scalability of the security test plug-ins 228-236 means they can be deployed across multiple instances or scaled up to handle larger applications and more extensive test cases. This flexibility ensures that security testing can grow alongside the application 210, maintaining thorough and effective security practices as the software evolves and expands. Accordingly, by leveraging the tailored, reusable, and scalable security test plug-ins 228-236, the SIA engine 214 can deliver precise and comprehensive security assessments, enhancing the overall security posture of software applications.

As shown, the SIA engine 214 may include a plug-in module 218 containing various components that initiate and execute a corresponding component or piece of logic present in each of the security test plug-ins 228-236. In other words, each of the security test plug-ins 228-236 may include a parser 224, a templator 226, an executor 240, and a reporter 244, as illustrated as part of the plug-in module 218. Before focusing on how the SIA engine 214, in particular the orchestrator module 216 interacts with each of these components, a broad explanation of each component is provided.

As noted above, each security test plug-in 228-236 may include the parser 224. The parser 224 may parse the security inputs provided from the initializer 222 to determine whether the necessary inputs are provided for a respective security test plug-in and, in some cases, extract information based on the security input, such as validating the received security inputs. For example, the parser 224 may validate URLs (e.g., security inputs) by performing GET calls to determine if the application 210 is up and running. Any invalid URLs identified by the parser 224 may be stored for reporting and excluded from the list of available URLs in the security testing scope. As can be appreciated, depending on the type of security input, the parser 224 may perform different validation processes.

Depending on the type of security test, one or more of the security test plug-ins 228-236 may include the templator 226. For example, the API test plug-in 228 and the Open API test plug-in 230 may include the templator 226. The templator 226 may be a template generator that creates validation test cases against the provided security inputs. In some cases, the templator 226 may collect and record vulnerability information from previous security assessments and create templates based on such vulnerability information. That is, the templator 226 may generate security test templates based on previous security assessments to provide tailored and focused security tests based on known security issues. In some embodiments, the templator 226 may generate malicious payloads and insert these payloads into the applicable security inputs for a respective security test. As used herein, a malicious payload may be a variable or element input into a security test with a purpose of exposing a particular vulnerability.

Once ready, the executor 240 may execute each of the templates as they are configured for a respective security assessment. Executing a configured template may include running smart fuzz logic against each configured template to achieve the attack surface in context. In cases where a specific security test does not include a configured template, such as for the TLS check plug-in 232, the executor 240 may execute the respective plug-in itself. Following the TLS check plug-in 232, this may include transmitting data to respective servers to ensure that it is encrypted using appropriate protocols and that certificates are correctly configured and validated according to test criteria.

As noted above, the executor 240 may run a smart fuzz logic on the templates. As those skilled in the art readily appreciate, smart fuzz logic may correspond to a fuzzing operation in which the security inputs for the application 210 are intelligently manipulated to uncover vulnerabilities by injecting unexpected or malformed data (e.g., malicious payloads). A fuzzing operation systematically tests how the application 210 handles edge cases and unexpected inputs, aiming to provoke crashes, unexpected behaviors, or security weaknesses that could be exploited by attackers. As such, the SIA engine 214, in particular the orchestrator module 216, may generate a wide range of input variations, including random data, sequences, and patterns designed to stress-test different parts of the software, such as file parsers, network protocols, or API endpoints. By identifying and exploiting these vulnerabilities, fuzzing helps improve software resilience and security by uncovering potential weaknesses that may not be apparent during conventional testing or code reviews.

Once each configured template (or security test plug-in that doesn't have a corresponding template) is executed, the reporter 244 may gather the respective results. That is, as each template (or plug-in) is executed, results from the respective security test that is performed may be generated. As such, the reporter 244 may gather each of these results and aggregate the results into a single report for that security assessment. As noted above, the SIA engine 214 is able to perform multiple security tests on the application 210 at a time, such as executing multiple security test plug-ins 228-236 during a single security assessment. As such, the results from multiple tests may be generated during the security assessment. The reporter 244 may gather and aggregate these results.

In some embodiments, the reporter 244 may determine security issues or vulnerabilities from each security test and collect information such as security issue type, relevant Common Weakness Enumeration (CWE) pattern category, request and response bodies, and other relevant information. The reporter 244 may also determine the severity or rating of the vulnerability issues identified from each of the security tests. This may be determined based on testing criteria, which may be provided to the SIA engine 214 as part of the input 205. An example report including results gather from the reporter 244 is described in greater detail below with respect to FIG. 6.

Returning now to the overall flow of the SIA engine 214, once the orchestration module 216, determines the respective security test plug-ins 228-236 for the security assessment, the SIA engine 214 may determine respective security inputs for each of the security test plug-ins 228-236 (350). As can be appreciated, each security test plug-in 228-236 may require different security inputs, depending on the security test to be performed. To determine security inputs for a respective security test plug-in, the orchestrator module 216 may include an initializer 222. For each security test plug-in, the initializer 222 may determine the security inputs.

The security input may include information required to perform a specific security test. That is, the security input may specify or relate to the parameters and settings necessary for each security test plug-in to perform its specialized security test. Security inputs may include API endpoints and keys (e.g., URLs and authentication keys), essential headers, authorization logic, encryption protocols, scanning rules, cloud configurations, threshold and limits, data formats, environmental variables, user credentials, and the like. In some embodiments, since the application 210 is still in development, the security inputs may include placeholder inputs or seeded inputs. As can be appreciated, placeholder inputs or seeded inputs may not correspond to valid information, but instead are used during development to test the functionality of the application 210. As will be expanded on below, in some embodiments, the SIA engine 214 may generate context-based security inputs to replace placeholder inputs such that the security tests can be performed using security inputs tailored to the application 210.

In an example, for API tests that may be performed using the API test plug-in 228, the initializer 222 may determine respective URLs and headers, while for TLS host tests that may be performed using the TLS test plug-in 232, the initializer 222 may determine a respective Host Port list. As can be appreciated, security inputs may vary depending on the security test to be performed. In some embodiments, for each of the security test plug-ins 228-236, the initializer 222 may determine information such as test criteria, requirement reporting type, and report location. For example, the developers may select test criteria for each security assessment that determines whether the application 210 passes the security tests or indicates various thresholds for identifying security issues.

Once the initializer 222 determines the security inputs for each respective security test plug-ins to be performed within the security assessment, the initializer 222 may configure each security test plug-in for the security assessment. Configuring each security test plug-in may include updating the security input used by each security test plug-in to a specific instance of the application 210. As can be appreciated, this may vary depending on the application 210 and the security tests being performed. In some embodiments, the initializer 222 may determine various security inputs that may be customized or tailored to the application 210. For example, for API or Open API security tests, the respective security inputs corresponding to endpoints queried during the security tests may be updated to the specific endpoints of the application 210.

For these security inputs, the initializer 222 may determine or generate context-based security inputs (352) based on the application 210. To illustrate generation of context-based security inputs, the following discussion focuses on API security tests. Specifically, API security tests using the Open API test plug-in 230 and the API test plug-in 228 are described. However, while the following focuses on the API test plug-in 228 and the Open API test plug-in 230, it should be appreciated that context-based security inputs may be generated in a similar method for other security test plug-ins.

In an embodiment where the initializer 222 determines that the API test plug-in 228 or the Open API test plug-in 230 is to be used during the security assessment, the initializer 222 may first determine the security inputs required for the respective API security tests. Such security inputs may include URLs, essential headers, authorization logic, and the like. Once these security inputs are determined, the initializer 222 may serialize each of these security inputs into a plug-in instance of the respective plug-in 228 or 230. Next, the initializer 222 may call a parser 224 of the plug-in module 218 to generate context-based security inputs for the respective plug-in 228 or 230.

To generate the context-based security inputs for the API test plug-in 228 and the Open API test plug-in 230, the parser 224 may determine an API schema associated with the application 210 (354) and extract elements from the API schema (356). In the case of the Open API test plug-in 230, the parser 224 may determine the API schema of the application 210 by receiving an API specification for the application 210 and determining the API schema from the API specification. As those skilled in the art may appreciate, an API specification is a detailed document or blueprint that outlines the structure, behavior, and endpoints of an API for a respective application, here the application 210. The API specification defines how different software components should interact, specifying the available methods, request and response formats, authentication mechanisms, and error handling procedures. An API schema, which represents the precise structure of data exchanged via the API, can be determined from the API specification by extracting the defined data models, including the types and formats of parameters, payloads, and responses. The API schema ensures that all data interactions conform to the expected patterns, facilitating consistent and reliable communication between different parts of the software system. As such, by generating context-based security inputs based on the API schema for the application 210, the SIA engine 214 can perform security attacks under realistic operating conditions.

In scenarios where the application 210 uses a normal, or non-open API, the parser 224 may determine an API schema for the application 210 by performing a series of GET requests to the application 210 and extracting API elements from the responses. For example, the parser 224 may send GET requests to suspected or estimated endpoints to observe the responses. From the responses to the GET requests, the parser 224 may determine data structure, such as field names, data types, and nested objects. Using the responses, the parser 224 may map out the API schema, such as API data models and endpoints, for the application 210.

Once the parser 224 determines a preliminary understanding of the API schema, the parser 224 may use PUT and POST requests to further explore the API schema. For example, the parser 224 may transmit PUT/POST requests with different payloads to determine how the API handles data creation and updates. From the responses from each of these requests, the parser 224 may extract various elements (e.g., data structure, API endpoints), to determine the API schema associated with the normal, non-open API. Using the API schema, the parser 224 may generate the context-based security inputs.

In the case of the Open API test plug-in 230, an API specification may be used to determine an API schema. From the API schema, the parser 224 may extract various elements corresponding to the security inputs. For example, if a security input is/employee-ID, then the parser 224 may extract elements relating to employee-ID, such as a listing of valid employee-IDs (e.g., 1234, 1235, 1236). From these elements, the parser 224 may generate the context-based security inputs.

Figure 5:
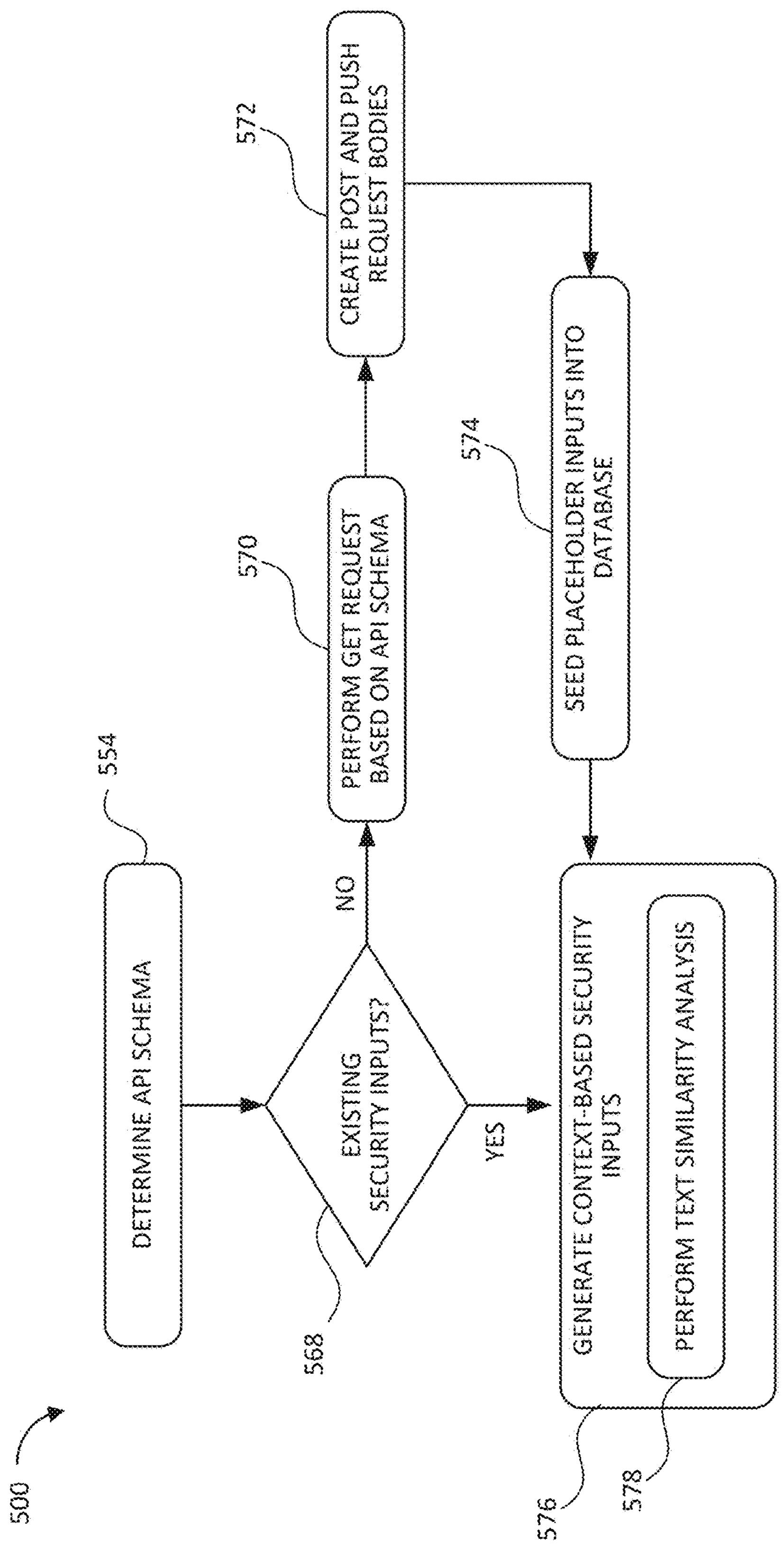
FIG. 5 illustrates an example operational flow for generating context-based security inputs from an API schema, according to an embodiment herein.

Referring now to FIG. 5, an example operational flow 500 for generating context-based security inputs from an API schema is illustrated, according to an embodiment herein. As shown, the flow 500 starts with determining an API schema (554). As noted above, in the context of the Open API test plug-in 230 this may include determining the API schema from an API specification. As those skilled in the art may readily appreciate, normal or non-open APIs may not have readily available API specifications due to various factors, such as internal use focus, implementation priorities, security considerations, or resource limitations. As such, the parser 224 may determine the API schema using the above techniques for non-open APIs.

Once the API schema is determined, the parser 224 may determine whether there is existing security input (568), such as placeholder inputs or seeded inputs within the API schema and a target test environment in context. As noted above, in some embodiments, the security inputs for a respective API schema may be seeded or populated with an initial, representative data set that simulates real-world scenarios to provide developers with a starting point to understand how the API interacts with data. In some cases, the API schema may be seeded by developers during development or previous testing to test the functionality of the application 210 across different use cases.

If the parser 224 determines that there are no existing security inputs for the application 210, the parser 224 may perform a GET request based on the API schema (570). That is, while an API specification may include existing security inputs (e.g., default values) which can be used as is, if the API specification does not include existing security inputs (e.g., default values) security inputs may be extracted through GET queries to frame the subsequent POST and PUT requests. In cases where an Open API type of schema exists, the bodies of PUT and POST requests can be created from the Models provided in Open API schema. In case of non-Open API Schema endpoints, the SIA engine 214 may use the existing security inputs seeded into the target test application since no other source is available. For example, the parser 224 may parse the API schema to identify specific endpoints, parameters, and expended responses and then query the endpoints defined in the API schema to retrieve data that hasn't been previously seeded and may contain placeholder inputs or no inputs at all. For example, the API schema may have an endpoint (e.g., security input) for/employee-ID, but may have placeholder inputs for the range of valid employee IDs, such as <employee-id1>, <employee-id2>, <employee-id3> (e.g., additional security inputs). Since the placeholder inputs are not valid values, any test performed using them may result in an invalid response or false positive of a security issue.

To seed these placeholder inputs, the SIA engine 214 may generate context-based security inputs for the placeholder inputs. As noted above, the SIA engine 214 may generate GET requests using the determined security inputs based on the API schema. For example, the GET request may be generated with appropriate headers and authentication tokens as specified in the API schema. After querying the application 210 with the GET requests, the parser 224 may receive API responses from the application 210, from which the parser 224 may extract relevant data fields and identify areas where additional information is required for subsequent actions. As can be appreciated, complex applications may require a sequence of security inputs, such that data received from one step be propagated into a next step for the request to be processed properly. In such cases, security inputs may include dependent security inputs.

Leveraging the data received responsive to the GET request, the parser 224 may generate respective POST and PUT request bodies (572). That is, the parser 224 may extract responses from the GET requests, scrub the responses (e.g., remove timestamps or ID related data), and format the POST and PUSH request bodies based on these scrubbed responses. The POST requests may be crafted to send new data to the API, while PUT requests may modify existing security inputs based on the retrieved information. By sending follow-up POST/PUSH requests, the SIA engine 214 can identify security inputs that are dependent on previous security inputs. That is, the POST/PUSH requests can identify a hierarchy arrangement of security inputs and determine context-based security inputs for respective security inputs having placeholder inputs (e.g., seed placeholder inputs for various security inputs with context-based security inputs).

After formulating the request bodies, the parser 224 may then seed placeholder inputs based on the scrubbed responses into a designated database (574). This may involve the parser 224 mapping the parsed data fields from the scrubbed responses to database tables or collections, ensuring consistency with the API schema's data models. As those skilled in the art readily appreciate, placeholder inputs, such as seeded inputs, serve as mock data placeholders that mimic real-world scenarios, facilitating further development and testing efforts. This process enables the developers to iteratively refine the API's functionality and validate its integration with backend systems, ensuring that the application operates seamlessly when exposed to live data and user interactions. By replacing the seeded placeholder inputs with data received from in the scrubbed responses, the parser 224 can generate context-based security inputs for the application 210 based on actual data from the application 210. Additionally, these context-based security inputs may be seeded into the designated database to be used by other security tests, either during this current security assessment or subsequent security assessments.

In some embodiments, seeding the placeholder inputs with the data received via the GET/POST/PUSH requests may include generating the context-based security inputs (576). That is, generating the context-based security inputs may include seeding placeholder inputs or security inputs as outlined generically for the application 210, such as within an API schema, with valid security inputs based on the application 210. That is, context-based security inputs, as used herein, may be security inputs that are customized or tailored to the application 210. For example, following the above/employee-ID example, under conventional security testing, a generic security input of "/employee-ID/number" may be used during the security testing. Since it is unlikely that any employee-ID would be "number" instead of an actual value, security vulnerabilities may be flagged for issues such as an invalid response from the application 210 or the application 210 failing to perform respective functions that require a valid employee-ID. Such security vulnerabilities would be false positives as they don't necessarily correspond to an actual security issue and instead are due to the use of generic security inputs during the security tests.

To avoid such false positives, the parser 224 generates and replaces respective variables or security inputs with the context-based security inputs. Following the example of the API schema, the parser 224 may analyze the API schema to determine security inputs that can be updated with the context-based security inputs. For example, if the API schema includes the security input that contains a placeholder input of "employee-ID/number" and the parser 224 determines a valid employee-ID number (e.g., 1234, 1235, 1236) from the response to the GET request, then the parser 224 may analyze the API schema to determine where "employee-ID/number" can be updated or replaced with the valid employee-ID number. In this example, the valid employee-ID number may be a context-based security input. As noted above, by substituting the security input with the context-based security input, the respective security test may be more accurate since the application 210 may recognize the context-based security input. That is, since the employee-ID number is valid, the application 210 may execute the security tests as if under real-world conditions, thereby exposing true security vulnerabilities.

In some embodiments, to generate the context-based security inputs for a respective security test plug-in, the parser 224 may perform a text similarity analysis (578). As can be appreciated, security inputs within the data structure, code, repositories, etc., for the application 210 may vary in format, structure, and, in some cases, terminology. Following the above example, the API schema may include the security input "employee-ID/number" throughout its description, including variations in format, such as having "employee-ID" on a first line and "/number" on a subsequent line. As such, if the parser 224 merely searched for "employee-ID/number" then it may miss security inputs having differing structure. As can be appreciated, there may be many variations on how a security input may vary in format, structure, and terminology, depending on the security input and the security test plug-in.

To capture security inputs having variations, the parser 224 may perform a text similarity analysis. For example, the parser 224 may parse the API schema, to pinpoint inputs that exhibit variations in format, structure, and terminology yet correspond to the same security input. In some embodiments, the text similarity analysis may involve tokenizing the API schema into individual elements, such as parameter names, descriptions, and data types. Natural language processing (NLP) techniques, including stemming and lemmatization, may also be applied to normalize these elements by reducing them to their base forms. Subsequently, similarity measures such as cosine similarity or Jaccard index may be employed to compare these normalized elements, highlighting those with high similarity scores despite different representations. This approach enables the identification of semantically similar security inputs that might be labeled differently across the API, facilitating a more comprehensive generating of context-based security inputs into the API schema's landscape and aiding in the standardization of the context-based security input throughout the security test.

Once the security inputs are determined, including generating context-based security inputs depending on the security test plug-in, the SIA engine 214 may generate one or more templates based on the security inputs (358). Generating templates may include configuring a template or generating a configured template based on the respective security test plug-in 228-236 (364). Generating templates based on the security input may be performed by the templator 226, which as described above, may configure a respective template based on the security inputs, attack type, attack surface, and testing criteria. The templator 226 may also generate and incorporate malicious payloads into a respective template. In other words, the templator 226 may templatize various test cases based on the attack to be performed, including configuring the template with the respective security inputs and malicious payloads to exposed targeted vulnerabilities.

In some embodiments, the initializers 222 may iterate through the parser 224 and templator 226, if applicable, for each of the security test plug-ins by systematically accessing each security input within the context of its respective plug-in. This may involve looping through the security inputs, which as noted above may specify the parameters and settings necessary for each plug-in to perform its specialized security test of each security test plug-in. For each security test plug-in, the initializer 222 may read the security inputs, validate them, ensure they meet the required criteria for the specific security test, and configure a respective template, if applicable. Once the security inputs are validated and processed, the initializer 222 may then serialize the security inputs and/or configured templates into a format suitable for instantiating a plug-in instance. Serialization may involve converting the security inputs and/or the configured template into a structured representation, such as JSON or XML, which can be easily stored, transferred, and utilized by the plug-in framework.

Once the security inputs are determined, the templates configured, and in some cases one or both are serialized, the SIA engine 214 may perform the security assessment of the application 210 (362). For example, the orchestrator module 216, in particular a controller 238, may coordinate creation of a plug-in instance for each respective security test plug-in 228-236. The controller 238 may call the executor 240 for each security test plug-in 228-236 to execute its respective function (364). For example, the executor 240 of a respective security test plug-in may create a plug-in instance using the serialized security input and/or configured template, initializing the plug-in instance with the necessary security inputs to execute the respective security test. As noted above, the orchestrator module 216 may iterate through and serializing the security inputs and/or templates such to ensure that each security test plug-in is correctly configured and ready to perform its specific security assessment, thereby enabling a streamlined and efficient security assessment.

As noted above, when called, the executor 240 for a given security test plug-in 228-236 may execute a fuzzing operation using the respective security inputs and/or templates. Once a respective security test plug-in is executed, the SIA engine may generate a report 215 of the results for the security assessment (366). In an instance, the executor 240 of a given security test plug-in may store the resulting data from the execution in a temporary location, such as a disk or memory, until the reporter 244 summarizes the results from each of the security tests. From the temporary location, the reporter 244 may gather the results from each of the security tests and aggregate the results in a single report. In some embodiments, the reporter 244 may collect data relating to security issue types, relevant CWE pattern or category, request and response bodies, security inputs used, and the like. The reporter 244 may also calculate a vulnerability rating for each security test based on test criteria, a number of security issues, and the type of security issue.

Once a respective instance for each security test plug-ins 228-236 has been executed by the executor 240 and the results gathered by the reporter 244, the orchestrator module 216 may generate the report 215 for the security assessment. In some embodiments, the orchestrator module 216 may include a results aggregator 242 that calls the reporter 244 from each plug-in instance and gathers the respective results. The results aggregator 242 may then aggregate and collate the results from each of security test to generate a final report 215 for the security assessment of the application 210. Once generated, the report 215 may be provided to the DevSecOps platform 204. As can be appreciated, the results within the report 215 may be used by developers to refine the application 210, including addressing any identified security issues and vulnerabilities.

Figure 6:
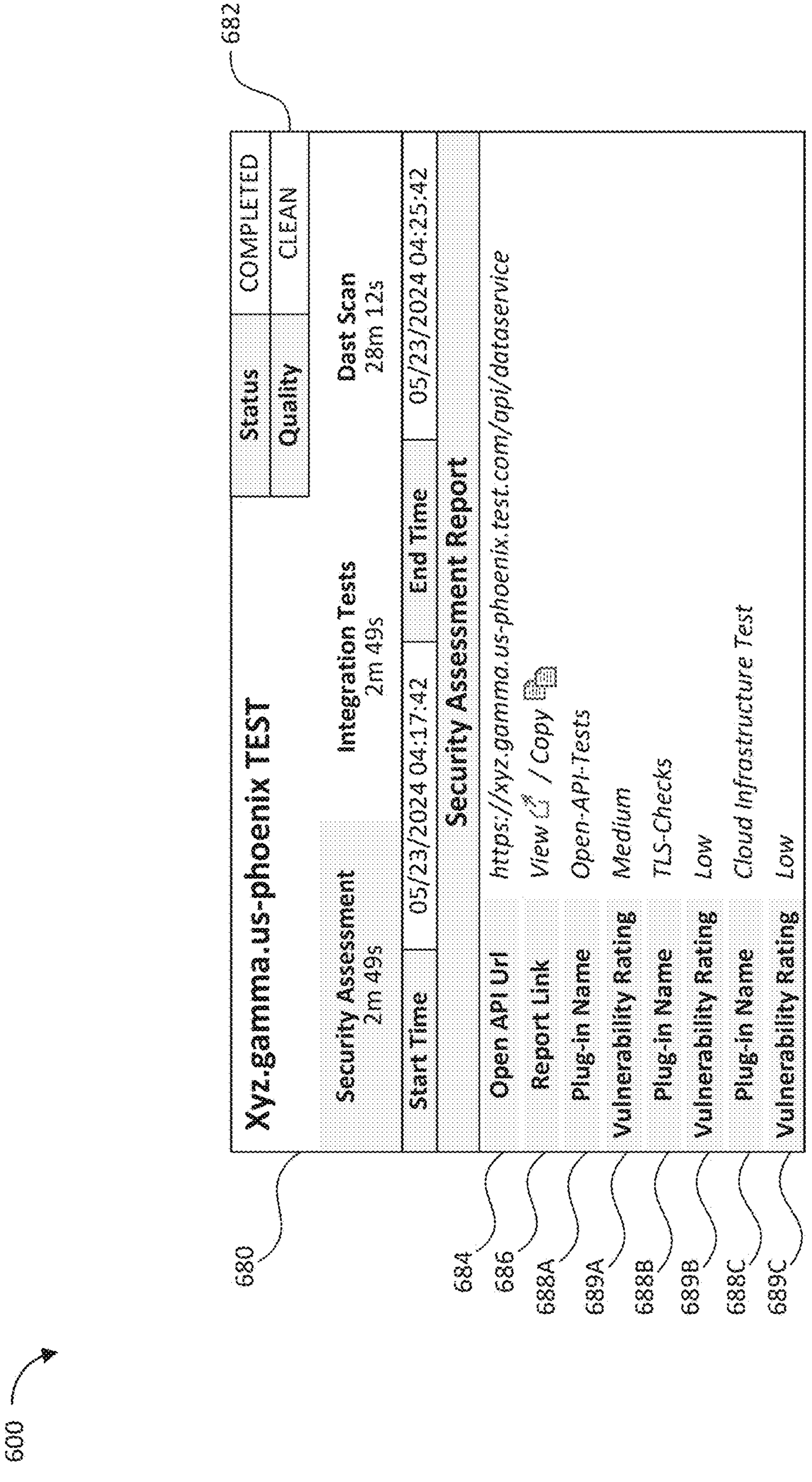
FIG. 6 illustrates an example report from a security assessment as performed by an SIA engine.

Referring now to FIG. 6, an example report 600 from a security assessment is illustrated, according to an embodiment herein. For ease of discussion, the report 600 is described with respect to the results from the security assessment of the application 210, as described above. As such, the report 600 may be generated by the SIA engine 214 responsive to the inputs 205 and include the results from security tests performed on the application 210. As shown, the report 600 may include information 680 that identifies the security assessment performed, including information such as the amount of time to perform the security assessment. The information 680 may also include a security summarization 682 indicating the status of the security assessment and an overall vulnerability rating for the security assessment. Here, the security summarization 682 notes that the status of the security assessment is "COMPLETED", and that the vulnerability rating or quality of the security assessment is "CLEAN."

The report 600 may include a results section corresponding to the results from each of the security test plug-ins executed during the security assessment. Here, the report 600 includes the results section from three security test plug-ins: 688A, 688B, and 688C. For each of the security test plug-ins, the report 600 includes a corresponding results section: 689A, 689B, and 689C. In the illustrated example, each of the results section 689A-C includes a vulnerability rating such as high, medium, and low.

The vulnerability rating can be determined based on specific test criteria provided by developers, DevSecOps administrators, or those with permissions within an respective organization, and these criteria can vary significantly in form. For instance, developers might define the test criteria in the input 205 by specifying thresholds for the number of security issues that categorize a threat as low, medium, or high vulnerability. For example, they might set a threshold where 1-5 issues constitute a low vulnerability threat, 6-10 issues signify a medium vulnerability threat, and more than 10 issues indicate a high vulnerability threat. In some cases, instead of a categorical approach, developers may choose to use a continuous or variable rating system. Instead of categorizing vulnerabilities into discrete levels such as low, medium, and high, they could use a numerical scale ranging from 1 to 10. In this scale, a rating of 1 might indicate minimal risk, while a rating of 10 reflects a critical vulnerability. Such a variable rating system may allow for more granular differentiation of security issues and can provide a more nuanced understanding of the severity of vulnerabilities. In some embodiments, the vulnerability rating for each of the security test plug-ins 688A-C may be aggregated to generate or compute the security summarization 682 for the overall security assessment.

Regardless of the approach (e.g., categorical thresholds or the numerical scale), by allowing the developers to set the testing criteria, the SIA engine 214 enables a flexible and tailored assessment of vulnerabilities, accommodating the specific needs and preferences of different development teams. This flexibility ensures that the vulnerability rating system can be adapted to various contexts and requirements, ultimately contributing to more effective security management and risk mitigation strategies.

In some embodiments, the report 600 may include an API URL 684 that allows a reviewing user to reach the application 210 if desired. Additionally, the report 600 may include a link 686 that provides the raw results from the security assessment. For example, if a reviewing user selects the link 686, the reviewing user may be directed to the raw results for each of the security tests performed during the security assessment. The raw results may include the security inputs used, criteria for each of the security tests, malicious payloads used during each security test, and the like.

Figure 7:
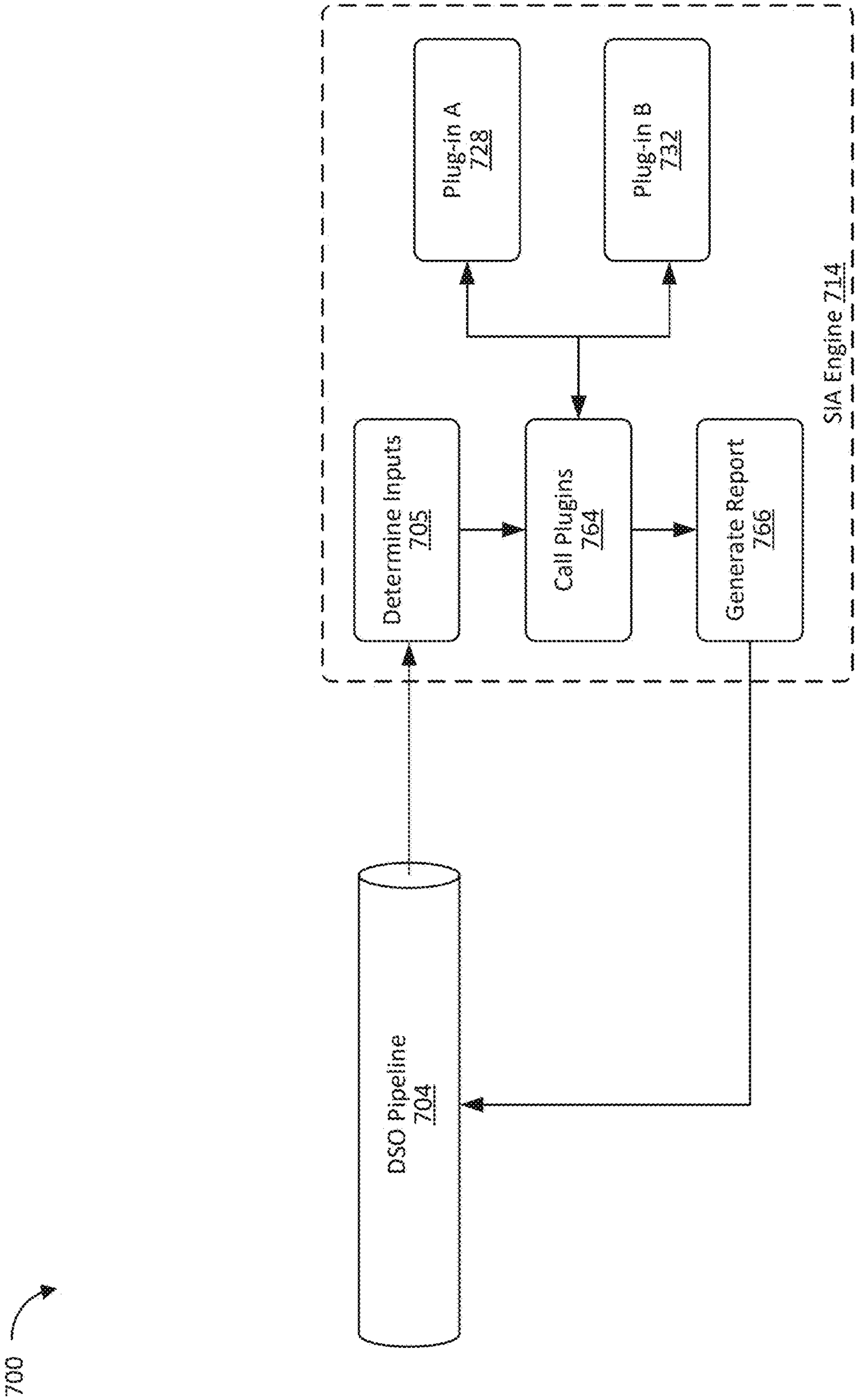
FIG. 7 illustrates an example operational flow illustrating a DevSecOps pipeline including a SIA engine, according to an embodiment herein.

Referring now to FIG. 7, an example operational flow 700 illustrating a DevSecOps (DSO) pipeline 704 including a SIA engine 714 is provided, according to an embodiment herein. The DSO pipeline 704 may be part of a DevSecOps platform, such as the DevSecOps platform 204, that contains an integrated set of automated processes and tools designed to incorporate security practices into the DevOps workflow through the various stages of development and deployment of an asset, such as the application 210. The DSO pipeline 704 is a critical component of a DevSecOps platform, which provides the overarching framework and infrastructure that support CI/CD, and continuous security for assets during development and deployment.

Within the DSO pipeline 704, the SIA engine 714, which may be the same or similar to the SIA engine 214, may be invoked at various stages to perform comprehensive security assessments, ensuring vulnerabilities are identified and addressed early in the development lifecycle. For example, during development of the application 210, the SIA engine 714 may be prompted to perform one or more security tests, as described above. From the DSO pipeline 704, the SIA engine 714 may determine inputs for requested security tests (705), such as the input 205 containing an input configuration file, a source code repository, dependency lists, environment-specific variables, and/or other information necessary for reproducing the application's 210 runtime environment accurately. Based on the inputs, the SIA engine 714 may determine the respective security test plug-ins for the requested security tests and call each respective plug (764). Here, the SIA engine 714 may call plug-in A (728) and plug-in B (732) sequentially. When each plug-in is called, an initializer 222 of the SIA engine 214 may coordinate with a respective parser 224 for each of the plug-ins to determine the security inputs, including generating context-based security inputs. And in cases where templates are generated, a respective templator 226 may configure respective templates for the requested security tests.

Once the security inputs are determined and respective templates configured, a controller 238 of the SIA engine 214 may coordinate with a respective executor 240 in each plug-in to execute the security tests. A respective report 244 for each plug-in may then gather the results from the security test and provide the results to a results aggregator 242 of the SIA engine 214. The results aggregator 242 may then generate a report of the security assessment (766). The report of the security assessment may be captured back into the DSO pipeline 704 to provide vital information regarding the security vulnerability of the application 210.

By integrating the SIA engine 214 and its related security assessments into the automated pipeline, organizations can achieve faster, more reliable, and more secure software releases, adhering to the principle of "shifting left" where security is a consideration starting from the beginning of the development process. This proactive approach reduces the risk of security breaches, lowers remediation costs, and ensures compliance with industry standards and regulations.

Referring now to FIG. 8, is a diagram of a system 800 configured to implement an SIA engine, according to an embodiment herein. The system 800 may be an example of an apparatus including a computing apparatus 891 that is representative of any system or collection of systems in which the various processes, systems, programs, services, and scenarios disclosed herein may be implemented. For example, computing apparatus 891 may be an example SIA engine, such as the SIA engine 214 or 714, a client device, such as the client devices 108, or any of the subcomponents depicted in environments 100 or 200 of FIGS. 1 and 2, respectively. Examples of computing apparatus 891 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 891 may be implemented as a single apparatus, system, or device or may be implemented in a distributed manner as multiple apparatuses, systems, or devices. Computing apparatus 891 may include, but is not limited to, processing system 896, storage system 893, software 895, communication interface system 897, and user interface system 899. Processing system 896 may be operatively coupled with storage system 893, communication interface system 897, and user interface system 899.

Processing system 896 may load and execute software 895 from storage system 893. Software 895 may include an SIA engine 892, which may be representative of any of the operations for providing an SIA engine or any of its related functions, as discussed with respect to the preceding figures. When executed by processing system 896, software 895 may direct processing system 896 to operate as described herein for at least the various processes, such as the process 300, operational scenarios or flows, such as the flows 500 and 700, and sequences discussed in the foregoing implementations. Computing apparatus 891 may optionally include additional devices, features, or functionality not discussed for purposes of brevity.

In some embodiments, processing system 896 may comprise a micro-processor and other circuitry that retrieves and executes software 895 from storage system 893. Processing system 896 may be implemented within a single processing device but may also be distributed across multiple processing devices or sub-systems that cooperate in executing program instructions. Examples of processing system 896 may include general purpose central processing units, graphical processing units, application specific processors, and logic devices, as well as any other type of processing device, combinations, or variations thereof.

Storage system 893 may comprise any memory device or computer-readable storage medium readable by processing system 896 and capable of storing software 895. Storage system 893 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 893 may also include computer readable communication media over which at least some of software 895 may be communicated internally or externally. Storage system 893 may be implemented as a single storage device but may also be implemented across multiple storage devices or sub-systems co-located or distributed relative to each other. Storage system 893 may comprise additional elements, such as a controller, capable of communicating with processing system 896 or possibly other systems.

Software 895 (including the SIA engine 892 among other functions) may be implemented in program instructions that may, when executed by processing system 896, direct processing system 896 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 895 may include additional processes, programs, or components, such as operating system software, virtualization software, or other application software. Software 895 may also comprise firmware or some other form of machine-readable processing instructions executable by processing system 896.

In general, software 895 may, when loaded into processing system 896 and executed, transform a suitable apparatus, system, or device (of which computing apparatus 891 is representative) overall from a general-purpose computing system into a special-purpose computing system as described herein. Indeed, encoding software 895 on storage system 893 may transform the physical structure of storage system 893. The specific transformation of the physical structure may depend on various factors in different implementations of this description. Examples of such factors may include, but are not limited to, the technology used to implement the storage media of storage system 893 and whether the computer-storage media are characterized as primary or secondary storage, as well as other factors.

For example, if the computer-readable storage medium is implemented as semiconductor-based memory, software 895 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 897 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 891 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing an SIA engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; processor-executable instructions stored on the computer-readable storage medium; and one or more processors coupled to the computer-readable storage medium and configured to execute the processor-executable instructions to provide a security intelligent automation (SIA) engine comprising a plurality of security test plug-ins configured to perform a security assessment on a plurality of Open System Interconnection (OSI) layers of a target application, such that the processor-executable instructions, when executed by the one or more processors, direct the computing apparatus, to at least: determine security inputs for a one or more security test plug-ins; generate one or more templates based on the security inputs, wherein the one or more templates correspond to a respective security test plug-in of the one or more security test plug-ins; perform the security assessment on the target application based on the one or more templates; and generate a report comprising results from the security assessment, wherein the report comprises results for each of the one or more security test plug-ins evaluated during the security assessment.

Example 2 is the computing apparatus of any previous or subsequent Example, wherein the processor-executable instruction to perform the security assessment on the target application based on the one or more templates, when executed by the one or more processors, further direct the computing apparatus to: perform the security assessment on the target application based on one or more of the security test plug-ins.

Example 3 is the computing apparatus of any previous or subsequent Example, wherein the processor-executable instructions, to determine the security inputs for one or more of the security test plug-ins comprises when executed by the one or more processors, further direct the computing apparatus to: determine an Application Programming Interface (API) specification associated with the target application; determine an API schema based on the API specification; generate context-based security inputs based on the API schema; and configure the one or more templates based on the context-based security inputs, wherein the security inputs comprise the context-based security inputs.

Example 4 is the computing apparatus of any previous or subsequent Example, wherein the processor-executable instructions, to determine the security inputs for one or more of the security test plug-ins comprises when executed by the one or more processors, further direct the computing apparatus to: query the target application to prompt one or more responses; receive the one or more responses from the target application; extract, from the one or more responses, API schema; generate context-based security inputs based on the API schema; and configure the one or more templates based on the context-based security inputs, wherein the security inputs comprise the context-based security inputs.

Example 5 is the computing apparatus of any previous or subsequent Example, wherein the processor-executable instructions, to determine the security inputs for one or more of the security test plug-ins when executed by the one or more processors, further direct the computing apparatus to: determine API schema associated with the target application; extract one or more elements from the API schema; perform text similarity analysis between the one or more elements from the API schema; and generate the security inputs based on the text similarity analysis.

Example 6 is the computing apparatus of any previous or subsequent Example, wherein the processor-executable instructions, to generate the report comprising the results from the security assessment comprises when executed by the one or more processors, further direct the computing apparatus to: generate a results section for each of the one or more security test plug-ins executed during the security assessment, wherein the results section comprises a security test name, test criteria, and identified vulnerabilities for each respective security test plug-in.

Example 7 is the computing apparatus of any previous or subsequent Example, wherein the plurality of security test plug-ins are configured to perform the security assessment on one or more of or within OSI layer 4 to layer 7 of the target application.

Example 8 is a method comprising: determining, by a security intelligent automation (SIA) engine, security inputs for a one or more security test plug-ins, wherein the SIA engine comprises a plurality of security test plug-ins configured to perform a security assessment on a plurality of Open System Interconnection (OSI) layers of a target application; generating, by the SIA engine, one or more templates based on the security inputs, wherein the one or more templates correspond to a respective security test plug-in of the one or more security test plug-ins; performing, by the SIA engine, the security assessment on the target application based on the one or more templates; and generating, by the SIA engine, a report comprising results from the security assessment, wherein the report comprises results for each of the one or more security test plug-ins evaluated during the security assessment.

Example 9 is the method of any previous or subsequent Example, wherein: determining, by the SIA engine, the security inputs for the one or more security test plug-ins comprises: determining, by the SIA engine, API schema; extracting, by the SIA engine, a plurality of elements from the API schema; generating, by the SIA engine, context-based security inputs based on the plurality of elements, wherein the security inputs comprise the context-based security inputs; and generating, by the SIA engine, the one or more templates based on the security inputs comprises: generating, by the SIA engine, one or more request bodies based on the context-based security inputs.

Example 10 is the method of any previous or subsequent Example, wherein: the method further comprises determining, by the SIA engine, criteria for each of the one or more security test plug-ins; and performing, by the SIA engine, the security assessment on the target application based on the one or more templates comprises: performing, by the SIA engine, the security assessment on the target application based on the criteria for each of the one or more security test plug-ins.

Example 11 is the method of any previous or subsequent Example, wherein the method further comprises: determining, from an input configuration file, a plurality of security tests; determining, by the SIA engine, the plurality of security test plug-ins based on the security tests, wherein each security test plug-in corresponds to a respective security test; and configuring, by the SIA engine, each of the security test plug-ins based on the security inputs.

Example 12 is the method of any previous or subsequent Example, wherein performing, by the SIA engine, the security assessment on the target application based on the one or more templates comprises: generating, by the SIA engine, malicious payloads based on the security inputs, wherein each of the malicious payloads are configured to identify a respective vulnerability within a target application.

Example 13 is the method of any previous or subsequent Example, wherein the SIA engine is executed within a DevSecOps (DSO) pipeline.

Example 14 is the method of any previous or subsequent Example, wherein the performing, by the SIA engine, the security assessment on the target application based on the one or more templates comprises: sequentially executing, by the SIA engine, each security test plug-in of the one or more security test plug-in.

Example 15 is the method of any previous or subsequent Example, wherein the one or more security test plug-ins comprise one or more of: a Transport Layer Security (TLS) test plug-in; a Cloud-Infrastructure test plug-in; a Crawler test plug-in; an Application Programming Interface (API) test plug-in; or an Open API test plug-in.

Example 16 is a computer-readable storage medium comprising processor-executable instructions, wherein the processor-executable instructions, in part, cause one or more processors to: determine, by a security intelligent automation (SIA) engine, security inputs for a one or more security test plug-ins, wherein the SIA engine comprises a plurality of security test plug-ins configured to perform a security assessment on a plurality of Open System Interconnection (OSI) layers of a target application; generate one or more templates based on the security inputs, wherein the one or more templates correspond to a respective security test plug-in of the one or more security test plug-ins; perform the security assessment on the target application based on the one or more templates; and generate a report comprising results from the security assessment, wherein the report comprises results for each of the one or more security test plug-ins evaluated during the security assessment.

Example 17 is the computer-readable storage medium of any previous or subsequent Example, wherein the processor-executable instructions to determine the security inputs for one or more of the security test plug-ins cause the one or more processors to further execute processor-executable instructions stored in the computer-readable storage medium to: determine API schema associated with the target application; extract one or more elements from the API schema; perform text similarity analysis between the one or more elements from the API schema; and generate the security inputs based on the text similarity analysis.

Example 18 is the computer-readable storage medium of any previous or subsequent Example, wherein the processor-executable instructions cause the one or more processors to further execute processor-executable instructions stored in the computer-readable storage medium to: generate, by a SIA engine, a vulnerability rating for each of the one or more security test plug-ins based on the security assessment.

Example 19 is the computer-readable storage medium of any previous or subsequent Example, wherein the processor-executable instructions cause the one or more processors to further execute processor-executable instructions stored in the computer-readable storage medium to: generate, by the SIA engine, a link to raw results for each of the one or more templates based on security assessment, wherein the report comprises the link to the raw results.

Example 20 is the computer-readable storage medium of any previous or subsequent Example, wherein: the processor-executable instructions to determine, by the SIA engine, the security inputs for the plurality of security test plug-ins cause the one or more processors to further execute processor-executable instructions stored in the computer-readable storage medium to: determine, by the SIA engine, an API schema associated with the target application; and generate, by the SIA engine, context-based security inputs based on the API schema; and the processor-executable instructions to generate, by the SIA engine, the one or more templates based on the security inputs cause the one or more processors to further execute processor-executable instructions stored in the computer-readable storage medium to: configure, by the SIA engine, the one or more templates based on the context-based security inputs.

Example 21 is the computer-readable storage medium of any previous or subsequent Example, wherein the processor-executable instructions to perform, by the SIA engine, the security assessment on the target application based on the one or more templates cause the one or more processors to further execute processor-executable instructions stored in the computer-readable storage medium to: execute, by the SIA engine, each security test plug-in of the one or more security test plug-ins.

What is claimed is:

1. A computing apparatus comprising:

a computer-readable storage medium;

processor-executable instructions stored on the computer-readable storage medium; and one or more processors coupled to the computer-readable storage medium and configured to execute the processor-executable instructions to provide a security intelligent automation (SIA) engine comprising a plurality of security test plug-ins configured to perform a security assessment on a plurality of Open System Interconnection (OSI) layers of a target application, wherein the plurality of OSI layers comprise Layers 4 to 7, such that the processor-executable instructions, when executed by the one or more processors, direct the computing apparatus to at least:

determine security inputs for a one or more security test plug-ins;

generate one or more templates based on the security inputs, wherein the one or more templates correspond to a respective security test plug-in of the one or more security test plug-ins;

perform the security assessment on the target application based on the one or more templates; and generate a report comprising results from the security assessment, wherein the report comprises results for each of the one or more security test plug-ins evaluated during the security assessment.

2. The computing apparatus of claim 1, wherein the processor-executable instruction to perform the security assessment on the target application based on the one or more templates, when executed by the one or more processors, further direct the computing apparatus to:

perform the security assessment on the target application based on one or more of the security test plug-ins.

3. The computing apparatus of claim 1, wherein the processor-executable instructions, to determine the security inputs for one or more of the security test plug-ins comprises when executed by the one or more processors, further direct the computing apparatus to:

determine an Application Programming Interface (API) specification associated with the target application;

determine an API schema based on the API specification;

generate context-based security inputs based on the API schema; and configure the one or more templates based on the context-based security inputs, wherein the security inputs comprise the context-based security inputs.

4. The computing apparatus of claim 1, wherein the processor-executable instructions, to determine the security inputs for one or more of the security test plug-ins comprises when executed by the one or more processors, further direct the computing apparatus to:

query the target application to prompt one or more responses;

receive the one or more responses from the target application;

extract, from the one or more responses, API schema;

generate context-based security inputs based on the API schema; and configure the one or more templates based on the context-based security inputs, wherein the security inputs comprise the context-based security inputs.

5. The computing apparatus of claim 1, wherein the processor-executable instructions, to determine the security inputs for one or more of the security test plug-ins when executed by the one or more processors, further direct the computing apparatus to:

determine API schema associated with the target application;

extract one or more elements from the API schema;

perform text similarity analysis between the one or more elements from the API schema; and generate the security inputs based on the text similarity analysis.

6. The computing apparatus of claim 1, wherein the processor-executable instructions, to generate the report comprising the results from the security assessment comprises when executed by the one or more processors, further direct the computing apparatus to:

generate a results section for each of the one or more security test plug-ins executed during the security assessment, wherein the results section comprises a security test name, test criteria, and identified vulnerabilities for each respective security test plug-in.

7. A method comprising:

determining, by a security intelligent automation (SIA) engine, security inputs for a one or more security test plug-ins, wherein the SIA engine comprises a plurality of security test plug-ins configured to perform a security assessment on a plurality of Open System Interconnection (OSI) layers a target application, wherein the plurality of OSI layers comprise Layers 4 to 7;

generating, by the SIA engine, one or more templates based on the security inputs, wherein the one or more templates correspond to a respective security test plug-in of the one or more security test plug-ins;

performing, by the SIA engine, the security assessment on the target application based on the one or more templates; and generating, by the SIA engine, a report comprising results from the security assessment, wherein the report comprises results for each of the one or more security test plug-ins evaluated during the security assessment.

8. The method of claim 7, wherein:

determining, by the SIA engine, the security inputs for the one or more security test plug-ins comprises:

determining, by the SIA engine, API schema;

extracting, by the SIA engine, a plurality of elements from the API schema;

generating, by the SIA engine, context-based security inputs based on the plurality of elements, wherein the security inputs comprise the context-based security inputs; and generating, by the SIA engine, the one or more templates based on the security inputs comprises:

generating, by the SIA engine, one or more request bodies based on the context-based security inputs.

9. The method of claim 7, wherein:

the method further comprises determining, by the SIA engine, criteria for each of the one or more security test plug-ins; and performing, by the SIA engine, the security assessment on the target application based on the one or more templates comprises:

performing, by the SIA engine, the security assessment on the target application based on the criteria for each of the one or more security test plug-ins.

10. The method of claim 7, wherein the method further comprises:

determining, from an input configuration file, a plurality of security tests;

determining, by the SIA engine, the plurality of security test plug-ins based on the security tests, wherein each security test plug-in corresponds to a respective security test; and configuring, by the SIA engine, each of the security test plug-ins based on the security inputs.

11. The method of claim 7, wherein performing, by the SIA engine, the security assessment on the target application based on the one or more templates comprises:

generating, by the SIA engine, malicious payloads based on the security inputs, wherein each of the malicious payloads are configured to identify a respective vulnerability within a target application.

12. The method of claim 7, wherein the SIA engine is executed within a DevSecOps (DSO) pipeline.

13. The method of claim 7, wherein the performing, by the SIA engine, the security assessment on the target application based on the one or more templates comprises:

sequentially executing, by the SIA engine, each security test plug-in of the one or more security test plug-in.

14. The method of claim 7, wherein the one or more security test plug-ins comprise one or more of:

a Transport Layer Security (TLS) test plug-in;

a Cloud-Infrastructure test plug-in;

a Crawler test plug-in;

an Application Programming Interface (API) test plug-in; or an Open API test plug-in.

15. A computer-readable storage medium comprising processor-executable instructions, wherein the processor-executable instructions, in part, cause one or more processors to:

determine, by a security intelligent automation (SIA) engine, security inputs for one or more security test plug-ins, wherein the SIA engine comprises a plurality of security test plug-ins configured to perform a security assessment on a plurality of Open System Interconnection (OSI) layers of a target application, wherein the plurality of OSI layers comprise Layers 4 to 7;

generate one or more templates based on the security inputs, wherein the one or more templates correspond to a respective security test plug-in of the one or more security test plug-ins;

perform the security assessment on the target application based on the one or more templates; and generate a report comprising results from the security assessment, wherein the report comprises results for each of the one or more security test plug-ins evaluated during the security assessment.

16. The computer-readable storage medium of claim 15, wherein the processor-executable instructions to determine the security inputs for one or more of the security test plug-ins cause the one or more processors to further execute processor-executable instructions stored in the computer-readable storage medium to:

determine API schema associated with the target application;

extract one or more elements from the API schema;

perform text similarity analysis between the one or more elements from the API schema; and generate the security inputs based on the text similarity analysis.

17. The computer-readable storage medium of claim 15, wherein the processor-executable instructions cause the one or more processors to further execute processor-executable instructions stored in the computer-readable storage medium to:

generate, by a SIA engine, a vulnerability rating for each of the one or more security test plug-ins based on the security assessment.

18. The computer-readable storage medium of claim 15, wherein the processor-executable instructions cause the one or more processors to further execute processor-executable instructions stored in the computer-readable storage medium to:

generate, by the SIA engine, a link to raw results for each of the one or more templates based on security assessment, wherein the report comprises the link to the raw results.

19. The computer-readable storage medium of claim 15, wherein:

the processor-executable instructions to determine, by the SIA engine, the security inputs for the plurality of security test plug-ins cause the one or more processors to further execute processor-executable instructions stored in the computer-readable storage medium to:

determine, by the SIA engine, an API schema associated with the target application; and generate, by the SIA engine, context-based security inputs based on the API schema; and the processor-executable instructions to generate, by the SIA engine, the one or more templates based on the security inputs cause the one or more processors to further execute processor-executable instructions stored in the computer-readable storage medium to:

configure, by the SIA engine, the one or more templates based on the context-based security inputs.

* * * * *